US006451886B1

(12) United States Patent
Krivohlavek et al.

(10) Patent No.: US 6,451,886 B1
(45) Date of Patent: Sep. 17, 2002

(54) UNIVERSAL CROSS LINKING COMPOUND AND POLYMER

(75) Inventors: Dennis Krivohlavek, 2505 Trailwood Dr., Claremore, OK (US) 74017; Richard R. Ziesmer, Collinsville, OK (US)

(73) Assignee: Dennis Krivohlavek, Claremore, OK (US)

( * ) Notice: Subject to any disclaimer, the term of this patent is extended or adjusted under 35 U.S.C. 154(b) by 0 days.

(21) Appl. No.: 09/570,511

(22) Filed: May 16, 2000

Related U.S. Application Data

(63) Continuation-in-part of application No. 09/257,616, filed on Feb. 25, 1999, now abandoned, which is a continuation-in-part of application No. 08/969,847, filed on Nov. 13, 1997, now abandoned.

(51) Int. Cl.$^7$ ................................................ C08L 95/00
(52) U.S. Cl. ............................. 524/68; 524/59; 524/71
(58) Field of Search ............................... 524/59, 68, 71

(56) References Cited

U.S. PATENT DOCUMENTS 5,256,710 A * 10/1993 Krivohlavek ................. 524/59

* cited by examiner

*Primary Examiner*—Peter Szekely
(74) *Attorney, Agent, or Firm*—Head, Johnson & Kachigian

(57) ABSTRACT

A polymer modified asphalt which includes asphalt, a polymer, an aldehyde or a melamine resin, and an element chosen from a group consisting of Group VI-A of Periodic Table, such as sulphur.

38 Claims, 11 Drawing Sheets

UNIVERSAL CROSS LINKING COMPOUND AND POLYMER

REFERENCE TO PENDING APPLICATIONS

This application is a continuation-in-part of U.S. patent application Ser. No. 09/257,616, filed Feb. 25, 1999, now abandoned, and entitled "Universal Cross Linking Compound And Polymer" which is a continuation-in-part of U.S. patent application No. Ser. No. 08/969,847, filed Nov. 13, 1997, and entitled "Universal Cross Linking Compound And Polymer", now abandoned.

REFERENCE TO MICROFICHE APPENDIX

This application is not referenced in any microfiche appendix.

BACKGROUND OF THE INVENTION

1. Field of the Invention

This invention teaches new and unexpected cross linking of several chemically different types of polymers by combining selected chemical moieties into a mixture which will cross link the chemically different polymer types. This invention further teaches the development of a new type of polymer with or without the cross linking chemical mixture which offers unexpected results. Both or either the new cross linking mixture and or the new polymer may be useful in many different industrial applications. Examples as to modify asphalts or bitumens are shown herein to illustrate utility of the teachings.

2. Prior Art

Previous to the invention disclosed herein, most known prior art centered upon various techniques for modification of asphalt by polymer combinations with no regard for direction of polymer chemistry to encompass all possible aspects of polymer structure. Rather, prior polymer art generally teaches one facet of polymer chemistry and structure as related to polymer usage such as modified asphalt. The art disclosed herein will set forth unexpected results by understanding the effects of combining the various possible polymer chemistry and structure interactions and relationships to polymer modified asphalt. This understanding of the various polymer chemistries and structures will be further augmented and disclosed herein by the unexpected results obtained with the use of a universal cross linking agent. By universal cross linking agent, it is meant that combinations of chemical moieties disclosed herein form mixtures which may be adjusted in ratio or by inclusion or exclusion of any chemical moiety disclosed herein to form a cross linking agent to optimize the effect of a cross link of various polymer chemistries and structures to themselves for industrial applications such as with asphalt or bitumen.

It has long been known in the rubber industry that from vulcanization, elemental sulfur will under go revision upon prolonged heating. It is also known that phenolic resin derivatives and in particular phenol formaldehyde derivatives do not as easily under go revision as sulfur. It is further understood in the art that the presence of Group VII-A elements (the so called Halides) of the Periodic Table of Elements will enhance the resistance of degradation of phenolic resin vulcanization to revision. The Group VII-A Elements may be present as attached to the phenolic ring of a phenol aldehyde or introduced separately in a salt form with Group IV-A Elements of the Periodic Table. Typical of this understanding is the paper entitled "The Vulcanization of Butyl Rubber with Phenol Formaldehyde Derivatives" by P. O. Tawney, J. R. Little and P. Viohl and presented at the Division of Rubber Chemistry meeting of the American Chemical Society on May 14–16, 1958 in Cincinnati, Ohio and is here in incorporated by reference. As will be shown in this disclosure, a direct application of the use of Group IV-A salts of Group VII-A Elements of the Periodic Table of Elements through the salt form will not yield satisfactory results when combined in phenol aldehyde polymer asphalt mixtures. Taught in this disclosure will be the unexpected results of combining metal sulfates and metal chloride (salts with phenol aldehyde resols resins in the presence of polymer asphalt mixtures).

U.K. Patent No. 368,236 issued to Robert Bosch Aktiengesellschaft found they could use phenol aldehyde condensation products catalyzed in the usual way with optional rubber and asphalt. The product is a plastic, not asphaltic in final usage, suitable for acid and electrical resistance applications. This art lacks discussing mix temperature parameters or processing except to state the use of a mixing machine or by rollers.

Russian Patent No. 732340 issued to Main Pipelines Construction teaches that a phenol formaldehyde resin may be used in a primer composition for pipe coatings. The teachings limit the phenol formaldehyde resin to 2.0% to 10.0% by weight in the formula. All materials are dissolved in a hydrocarbon solvent at room temperature or with gentle heating. There is no disclosure for cross linking the phenol formaldehyde resin or that it is of the reactive type.

The Russian Patent No. 761527 issued to Polymer Construction Material teaches the use of pentachlorophenol resin in solvent based systems. The teachings of the art limit bitumen to 65.0% to 70.0% in terms of weight percent. It is not stated that the pentachlorophenol is of a reactive form or made reactive for use in cross linking reactions. Pentachlorophenol is normally not reactive and is used to improve aging and or tack. The butyl rubber is described in detail as follows: the molecular weight ranges from 13,000 to 27,000 containing 1.5% to 1.9% vinyl groups, 0.20% to 0.25% secondary amino groups and 0.25% to 0.30% hydroxyl groups. The product of the process is for pipe coatings.

In German Patent No. DE 3630132A issued to J. Haas is taught that cross linking agents may be formed by combining sulfur in plasticizer oil with oxidants, vulcanization auxiliary agents or other combinations. This art also teaches that the sulfur containing vapor may be collected as filter material and reused in the next batch.

The U.S. Pat. No. 3,275,585 issued to Baum et al. and assigned to Mobil Oil Corporation disclosed the aldehyde as the main source of polymeric material and does not teach or disclose the use of any type or rubber or other elastomeric materials. The use level of the aldehyde of from 1 to 25% and preferably 5 to 15% based upon the weight of the asphalt. A strong mineral acid catalyst, hydrochloric or toluene sulfonic acid for example, is at the 0.1% to 5.0% and preferably 0.1 to 2.0% use level based upon the weight of the asphalt. There is no discussion of reactions of, with or by cross linked carboxylic acid terminated vinyl aromatic/conjugated diene polymers with a universal cross linking compound suitable for cross linking various polymer types.

In U.S. Pat. No. 3,547,805, inventor Montgomery teaches the use of alkali metals to polymerizing in situ conjugated dienes and vinyl substituted aromatic compounds. The preferred alkali metal is sodium. The preferred diene is 1,3-butadiene. The preferred vinyl substituted aromatic compound is styrene. Characteristics of the process are changes or increases in ring and ball softening point and higher penetration ratio. The penetration ratio is defined in column 3, line 1 through line 3 as the ratio of the penetration at 39.2° F. (4° C.) to the penetration at times 100 as determined by ASTM Test Method D5-61.

Prior art by Krivohlavek, U.S. Pat. No. 5,256,710 teaches that carboxylated styrene butadiene and similar types of rubber polymers without carboxylation in use with one and two step phenolic curing resins with or with out the presence of sulfur or sulfur donors or accelerators activated by or catalyzed by heat or amines (Hexamethylene tetraamines as a specific example) may be used to modify or cross link polymer modified asphalt. This work did not address further polymer chemistry or the use of metal chlorides or sulfates. Klutz in U.S. Pat. No. 5,278,207 and U.S. Pat. No. 5,322,867 teaches the use of various poly amine compounds to crosslink carboxylic acids grafted to pre formed styrene butadiene block copolymers to be used in asphalt modification. In the art disclosed by Klutz, various acrylic acid or methacrylate or melaic moieties are used as a source for grafting a carboxylic acid or anhydride to the polymer backbone. Gorbathy, U.S. Pat. Nos. 5,288,773 and 5,336,805 and 5,348,994 disclose the potential for sulfonation of styrene butadiene block copolymers and subsequent cross linking by amines or metallic compounds in the presence of asphalt.

Gorbathy also taught in U.S. Pat. No. 5,336,705 the utility of acrylic acid terpolymers with sulfonated rubber such as EPDM and styrene butadiene in the presence of oxidized asphalt and neutralized (or cross linked) by cations having +1 to +3 valence. A typical acid terpolymer is given in EXAMPLE 1, column 9, lines 11, 12 and 13 as 1% acrylic acid and 23% methyl acrylate and melt index equal to 5.

Moran, et al. teaches that mineral acids may be used to help make various polymers such as ethylene vinyl acetates more compatible with asphalts in U.S. Pat. Nos. 4,882,373 and 4,873,275 and 5,095,055 and alpha-olefins in U.S. Pat. No. 5,393,811 collectively.

Societe Chimique Des Charbonnages a French Body Corporate of Tour Aurore Cedex 05,92080 Plaris LaDefence, France in United Kingdom Patent No. 1,534,182 teaches that ethylene vinyl acetate copolymers may be cross linked with various combinations of acids, metal alcoholate and boric acid (borax) and possibly in the presence of elemental sulfur.

Saito et.al. in U.S. Pat. No. 4,292,414 teaches that carboxylic acids grafted to styrene in styrene butadiene block polymers may be cross linked with various multivalent metal oxides but does not teach the utility of such in asphalt.

Fisher in U.S. Pat. No. 5,190,998 addressed the art of improving or increasing elastic recovery by the presence of 10% or greater 1,2 vinyl content in homopolymers of polybutadiene and free of sulfur or peroxide cross linking agents.

Maldanado teaches the use of carboxylated styrene butadiene block copolymers in vulcanization with sulfur in U.S. Pat. No. 4,330,449 attributing improvement to reversible salt formations with asphalt metal ions. There is no discussion of the addition of metal ions to the asphalt rubber mixture or as a part of a vulcanization step.

Maldonado et al. in U.S. Pat. No. 4,145,322 disclosed the use of sulfur with primarily styrene butadiene block copolymers. There were no other cross linking systems disclosed or taught. Van Reijendam et al. disclosed in U.S. Pat. No. 4,011,184 that bitumen-polymer compositions may be improved by chemically coupling a modified bitumen and a modified polymer with a metal compound. Both the bitumen and the polymer are modified with ethylenically unsaturated carboxylic acids or their anhydrides before combination. The metal compound may be from Groups I to IV of the Periodic Table as given in claim 1.

Fitoussi et.al. disclose in U.S. Pat. No. 4,237,052 grafting dihalopolybutadiene receptors to asphalt modified with block copolymers. Elastomers may be polystyrene and butadiene or similar and a vulcanizable polynoroborene. Sulfur may serve as a covulcanization agent. This patent does teach multiple vulcanization routes with in the same polymer family of polynoroborene but does not teach the use of a universal cross linking agent or compound for other types of polymers with or in asphalt.

Mancini taught the use of dicarboxylic acids or anhydrides of those acids to be reacted in polymers of styrene butadiene styrene (claim 7) in asphalt in U.S. Pat. No. 5,225,462. Mancini also taught a 190 to 240° C. process temperature was needed for improved properties.

Marzocchi et al. taught in U.S. Pat. No. 4,301,051 and U.S. Pat. No. 4,404,316 that a chemically modified asphalt be prepared by reacting polymerizable vinyl monomers and a rubbery polymer. Cross linking reactants such as epoxies and organic polyisocyantes may be used with hydroxy terminated polybutadiene components in asphalt. Additionally, carboxylic acids or their anhydrides may be used as cross linking reactants.

Kriech et al. disclosed a type of gelled asphalt cement in U.S. Pat. No. 4,874,432 comprised of at lease one fatty acid and at least one resin acid with an alkali metal base there by limiting the amount of water necessary to form a gel. The product of the process is said to improve temperature susceptibility of asphalts.

Gelles et al. teaches in U.S. Pat. No. 5,189,083 the use of methacrylic acid (a alkyl methacrylate) in polymer formations involving aromatic vinyl hydrocarbons and conjugated dienes such as styrene and butadiene respectfully to form acid or acid anhydride blocks within the polymer structure. These polymers are subsequently used to modify asphalt. High vinyl content within the conjugated dienes is presumably for hydrogenation of the vinyl component as no claims or examples are set forth as to utility in further cross linking through vinyl component unsaturation. Gelles et al. further state in column 2 lines 38 and 39 that "End capping does not provide a high level of functional groups." While this is obviously true, there is then a lack of understanding of the value of cross linking functional group end capped polymer chains in conjunction with cross linking through vinyl diene component unsaturation of a polymer. Further bearing out this lack of understanding is evidenced in column 8 lines 16 through 19 where in conventional cross linking approaches or (not "and" or "both") cross linking through methacrylate derivative groups may be utilized. There is no art taught nor are there any examples of combining multiple cross linking features available through the polymer chemistry.

Doyle et al. in the series of U.S. Pat. Nos. 5,437,717 and 5,476,542 and 5,496,400 teaches that a improved cross linking agent may be created which is substantially anhydrous by combining tall oil, a strong base, fatty amines and either n-methyl fatty acid taurate, anhydrous catenary ammonium chloride or di-ethyl sulfate quat. This mixture may be used either alone in the asphalt or in asphalt which has been modified by ground tires. Doyle et al. does not address issues related to polymer chemistry or structure.

The prior art does not teach the unexpected utility of cross linking various polymer chemistries with a universal cross linking agent. Prior art does not teach the unexpected utility of combining components of polymer chemistry in a orderly manner to maximize the advantages of a universal cross linking agent.

SUMMARY OF THE INVENTION

The invention disclosed herein relates to a new and novel cross linking agent resulting from the combination of a mixture of various chemical moieties and may be used in polymer modified asphalt or bitumen. Further distinction of this new cross linking agent over previously disclosed art is the unexpected ability to cross link with polymers of differing chemical composition and the resulting vastly different polymer classes or types which may be in the presence of asphalt or bitumen. The development of this new cross linking agent offers improvements to a polymer asphalt or bitumen blend previously not easily attained or expected. These improvements are as a result of physical property improvements to asphalt or bitumen polymer blends.

Related to the invention of the new and novel cross linking agent is the unexpected find and development of the new cross linking agent with a new type of polymer. Previously, those schooled in polymer modified asphalt or bitumen had available to them polymers with limited means of cross linking within the asphalt. The new type of polymer disclosed and invented as a result of these teachings distinguishes itself by unexpected improvement within the polymer asphalt or bitumen mixture either alone or in conjunction with previously known cross linking agents or with the new cross linking agent related to this disclosure.

DETAILED DESCRIPTION OF THE PREFERRED EMBODIMENTS

Figure 1:
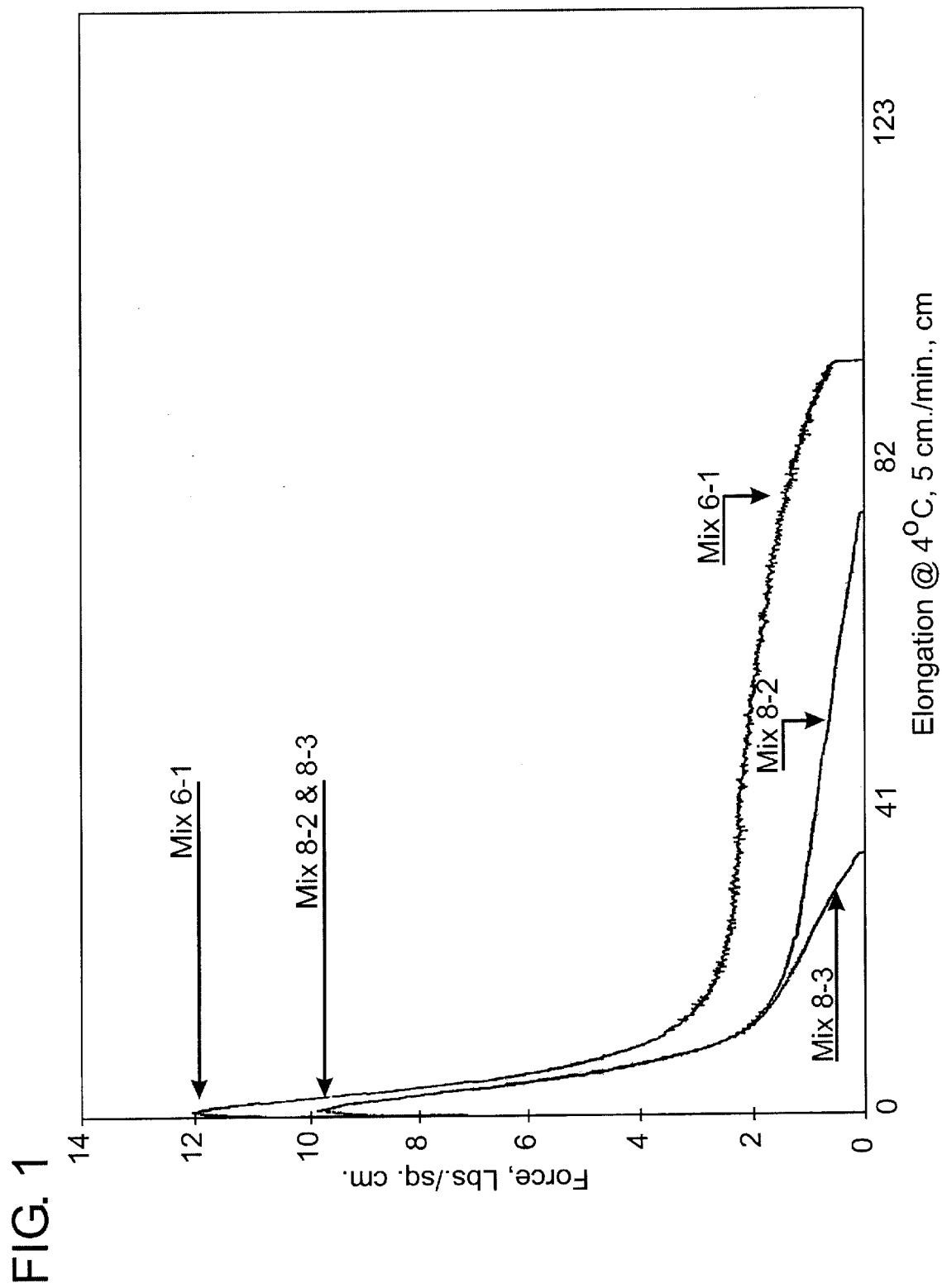
FIGS. 1 through 11 are graphs charting tests of force ductility measuring force versus elongation, illustrating the present invention.

The present invention may be appreciated from a series of tests employing its chemical moieties and procedures.

The American Society for Testing and Materials tests used to illustrate the teaching of this disclosure are as follows:
Penetration by ASTM D5 at 25° C., 100 grams, 5 seconds.
Penetration by ASTM D5 at 4° C., 200 grams, 60 seconds.
Absolute Viscosity (Vacuum Capillary) by ASTM D2171.
Kinematic Viscosity by ASTM D2170.
Ductility by ASTM D113 at 4° C., 5 cm/min Pull Rate.
Softening Point (Ring and Ball Method) by ASTM D36.
Thin Film Oven Test by ASTM D1754.

Non American Society for Testing and Materials tests used to illustrate the teaching of this disclosure are as follows:
Force-Ductility of Bituminous Materials at 4° C., 5 cm/min Pull Rate—Replace the brass wedged side pieces of ductility mold from ASTM D113 with straight sided pieces. Attach one end of briquet clip to fixed position on pulling head of Ductilometer of ASTM D113. Attach other end of briquet clip to load or force cell in such a fashion as to place the loading chain parallel and in direct line with the test specimens such that load carried by the test specimens during testing will be transmitted directly to the load cells. Data was acquired by analog to digital processing in a computer. Conditioning of the sample briquets were in accordance with ASTM D113. This general description of apparatus and procedure is as outlined by ASTM D04.44 Task Force—Force-Ductility of Bituminous Materials, 1986 and included here in by reference.

Percent Elastic Recovery of Bituminous Materials at 25° C.—Condition specimen per ASTM D113 and elongate at 5 cm/min to 20 cm. and stop. Allow specimen to relax 5 minutes then cut about the center. Leave specimen undisturbed for 60 minutes. Pull ductilometer head until cut ends of specimen touch. Record the reading on the Ductilometer as length L in centimeters to nearest quarter centimeter. Calculate the % Elastic Recovery (%ER) as follows: ((20−L)/20)×100=% ER.

The Separation Test for Polymer Modified Bituminous Materials—In approximately 1 inch diameter by 5.5 inch length blind aluminum tubes pour approximately 50.0 grams of test specimen. Seal open end of tube by flattening and folding over twice. Store vertically in test tube rack undisturbed in 163° C. oven for 48 hours. Holding in vertical position, remove specimen from test tube rack and place vertically in approximately −4° C. freezer for a minimum of four hours. After freezing, cut specimen into about one third portions based upon weight as Top (T), Middle (M) and Bottom (B) portions. Discard the Middle (M) portion. Measure the Softening Point as per ASTM D36 of the Top (T) portion and Bottom (B) portion and record each respectively. Calculate the Separation (S) of the polymer from the asphalt or bitumen as follows: S=T−B.

The mix procedure for preparing the polymer modified asphalt experiments is, unless otherwise noted, as follows:
01) To a round friction top quart can add the formula amount of asphalt at about 180° C.
02) Mix by 3.2 cm. turbine prop at 4 cm depth and 150 to 300 rpm (depending upon polymer concentration) at 180+3° C. or 180 to 183° C. with no vortexing of contents of can.
03) Add formula amount of polymer and continue mixing at temperature and no vortex.
04) Continue with Step 03) until polymer is dissolved or digested.
05) When polymer is dissolved or digested, record time to dissolve or digest.
06) Add chemical components of cross linking agent and continue mixing at temperature with no vortexing for two to four hours.
07) Remove from mixer, seal quart can and store in 135–150° C. oven over night.
08) Test sample after oven storage.

EXAMPLES OF THE PREFERRED EMBODIMENT

Aldehydes or Melamine in Asphalt

The use of aldehydes or melamine in asphalt has been known for some time. See for example U.S. Pat. No. 3,275,585 issued to Baum et al. and assigned to Mobil Oil Corporation disclosing the use of aldehyde as the main source of polymeric material to modify asphalt. Their application and use has taught acid catalysis of aldehydes in asphalt binders and is now included herein by reference. The utility or effect of aldehydes or melamines or both in combination on polymer modified asphalt has not been well understood. What has been found is that it is not necessary to preform the acid catalysis step in the presence of rubber polymers in asphalt. Table 1 below illustrates this finding. Mix No. 1-0 is the control asphalt. Mix No. 1-1 is the control asphalt with a styrene butadiene styrene block copolymer (SBS) rubber. Mix No. 1-0 and Mix No. 1-1 then compare with Mix No. 1-2 and Mix No. 1-5 which contain 0.50% and 0.10% respectively of the aldehyde furfural. These data show the increase in absolute viscosity values from the presence of the aldehyde over the control asphalt and the SBS rubber modified asphalt. Further comparison of Mix No. 1-1 to Mix No. 1-3 indicates melamine resin is also effective in increasing the absolute viscosity of a polymer modified asphalt. It is now obvious that combinations of aldehydes and melamine resins may effect polymer modified asphalts.

Examination of Mix No. 1-0 to Mix No. 1-6 indicates that as little as 0.05% aldehyde may increase the absolute viscosity of an asphalt which has not been modified with a polymer.

TABLE 1

Aldehyde in Asphalt and Polymer Modified Asphalt

| Formula %/Test/Mix No. | 1-0 | 1-1 | 1-2 | 1-3 |
|---|---|---|---|---|
| Asphalt | 100.00 | 96.75 | 96.25 | 96.25 |
| SBS Rubber | | 3.25 | 3.25 | 3.25 |
| Aldehyde - Furfural | | | 0.50 | |
| Melamine Resin | | | | 0.50 |
| Absolute Viscosity, P | 526 | 2615 | 5483 | 3804 |
| Softening Point, ° F. | 110 | 126 | 125 | 133 |
| 4° C. Penetration, 1/10 mm | 37 | 34 | 34 | 33 |

| Formula %/Test/Mix No. | 1-4 | 1-5 | 1-6 |
|---|---|---|---|
| Asphalt | 99.50 | 96.65 | 99.50 |
| SBS Rubber | | 3.25 | |
| Aldehyde - Furfural | 0.50 | 0.10 | 0.05 |
| Melamine Resin | | | |
| Absolute Viscosity, P | 856 | 4150 | 617 |
| Softening Point, ° F. | 116 | 150 | 111 |
| 4° C. Penetration, 1/10 mm | 39 | 30 | 31 |

Aldehydes with Group VIA Elements of the Periodic Table

The art of using elemental sulfur as a vulcanization agent in the rubber industry is well known. Many examples of this are known in the polymer modified asphalt industry. Such examples as taught in U.S. Pat. No. 4,237,052 or U.S. Pat. No. 4,330,449 are typical of vulcanization in polymer modified asphalt and are now included herein by reference. Elemental sulfur is known to be a member of Group VIA of the Periodic Table of Elements. Other Group VIA elements of the Periodic Table of Elements have been investigated for vulcanization of polymer modified asphalt. See for example U.S. Pat. No. 5,270,361 as a disclosure of such art and now included herein by reference. Unexpectedly and now taught in this disclosure are results of combining aldehydes or melamine resin with elements of Group VIA of the Periodic Table of Elements to further improve polymer modified asphalt.

By example as shown in Table 2 below, the unexpected improvement is illustrated by changes in penetration, softening point and absolute viscosity. A change in the mix procedure when preparing the samples is as follows: When both the Aldehyde—Furfural (F) and the Group VIA Element—S (Sulfur) were added to the formula, the first component was added to the polymer modified asphalt and allowed to mix for 4.0 to 4.5 hours followed by the second component addition whereupon it was mixed an additional 2.0 to 2.5 hours before being stored in the oven over night for testing the next day.

The unexpected results of order of addition of the Aldehyde—Furfural (F) and the Group VIA Element—S (Sulfur) are shown by examination of the absolute viscosity. In Table 2 Mix No. 2-2 the Addition Sequence was Group VIA Element—S (Sulfur) followed by the Aldehyde—Furfural (F); in Mix No. 2-3 the Addition Sequence was reversed. Examination of the absolute viscosity data indicate higher values for Mix No. 2-3 (F-S) over that of Mix. 02(S-F) as 11215 Poise and 4639 Poise respectfully.

Surprisingly, by comparison, the absolute viscosity was lowest (2610 Poise) when in Mix No. 2-1 both the Aldehyde—Furfural (F) and the Group VIA Element—S (Sulfur) are added together or at the same time.

Another unexpected result of the order of addition is shown in the 4° C. Penetration data. The data indicates that the addition of the Aldehyde—Furfural (F) before the addition of the Group VIA Element—S (Sulfur) will yield a significant improvement in 4° C. Penetration values over the opposite order addition (Mix No. 2-2) or either the Aldehyde—Furfural (F) alone as in Mix No. 2-0 or the Group VIA Elements—S (Sulfur) of Mix No. 2-4.

It is now obvious to one of average skill that from these teachings other test parameters and their values would be adjusted by the order of addition and that these disclosures are not limited to the specific tests illustrated in Table 2 but are for exemplary purposes only.

TABLE 2

Aldehyde and Group VIA Element in Polymer Modified Asphalt

| Formula %/Test/Mix No. | 2-0 | 2-1 | 2-2 | 2-3 | 2-4 |
|---|---|---|---|---|---|
| Asphalt | 95.75 | 95.65 | 95.65 | 95.65 | 96.65 |
| SBS Rubber | 3.25 | 3.25 | 3.25 | 3.25 | 3.25 |
| Aldehyde - Furfural | 1.00 | 1.00 | 1.00 | 1.00 | |
| Group VIA Element - S | | 0.10 | 0.10 | 0.10 | 0.10 |
| Addition Sequence | F only | F + S | S - F | F - S | S only |
| Absolute Viscosity, P | 7446 | 2610 | 4639 | 11215 | 9435 |
| Softening Point, ° F. | 130 | 128 | 129 | 135 | 135 |
| 4° C. Penetration, 1/10 mm | 30 | 32 | 35 | 40 | 35 |

Sodium Hydroxide with Group VIA Elements of the Periodic Table

It has been shown in prior art that elements of Group VIA of the Periodic Table of Elements can be used to vulcanize polymers in asphalt. Examples of such known art are disclosed in U.S. Pat. Nos. 4,330,449 and 4,145,322 using elemental Sulfur and U.S. Pat. No. 5,270,361 using Selenium and are now included here in by reference. These teachings utilize powder or dry forms of the elements or organic compounds containing the elements of the Group VIA Elements of the Periodic Table. Many times it is desirous to have such vulcanization agents and related accelerators in liquid forms such as an oil dispersions. Such are teachings disclosed in U.S. Pat. Nos. 5,382,612 and 4,554,313 and are now included here in by reference. But, oils are expensive and offer their own related effects upon polymer asphalt blends that may or may not be desirous in a final product. It is also known in the art that Group VIA Elements of the Periodic Table of Elements may be premixed with styrene butadiene latex dispersions or emulsions. A typical example of these products and the related literature is marketed as Butanol® NX 1106 by BASF Corporation in the United States of America and now included here in by reference. It is also known in the art that such latex systems have long term storage problems associated with the presence of the Group VIA elements and related vulcanization accelerators.

The use of alkali metals to react with polymer modified asphalt is taught in U.S. Pat. No. 3,547,805 when the polymer is of conjugated dienes and vinyl-substituted aromatic compounds and is included by reference. None of the prior art teaches the use of alkali metal hydroxides with Group VIA elements. It is known that Group VIA elements will dissolve in alkali metal hydroxide water solutions.

Previously unknown was the utility of Group VIA elements dissolved in alkali metal hydroxide water solutions in polymer modified asphalts. In the series of experiments related to Table 3 below, elemental sulfur such as commonly used to vulcanize rubber was dissolved in sodium hydroxide. The resulting mixture and related compounds formed thereof were added to the polymer modified asphalt. Referring to the data in Table 3, mix 3-3, 3-4 and 3-0 which have the alkali metal hydroxide water solutions, yield the unexpected results of improved elastic recovery to near the level of the SBS rubber alone as shown in mix 3-1. Mix 3-2 is included for comparative purposes as previous art. Mix 3-03, having an equal amount of Group VIA element Sulfur to mix 3-2 has improved elastic recovery and slightly higher ductility even though the penetration value in mix 3-3 is lower. From these teachings one skilled in the art would expect other physical test results to reflect these chemical modifications to the polymer modified system.

TABLE 3

Group VIA Element - S in or with Sodium Hydroxide

| Formula %/Test/Mix No. | 3-0 | 3-1 | 3-2 | 3-3 |
|---|---|---|---|---|
| Asphalt | 100.00 | 97.00 | 96.90 | 96.80 |
| SBS Rubber | | 3.00 | 3.00 | 3.00 |
| Group VIA Element - S | | | 0.10 | |
| Group VIA Element - S from 30 wt. % Sodium Hydroxide | | | | 0.10 |
| NaOH from 30 wt % Solution of Sodium Hydroxide | | | | 0.10 |
| 25° C. Penetration, 1/10 mm | 155 | 124 | 132 | 106 |
| Ductility @ 4° C., 5 cm/min, cm. | B @ M | 60.25 | 71.25 | 73.50 |
| Elastic Recovery @ 10° C., % | 2.50 | 87.50 | 78.75 | 87.50 |

| Formula %/Test/Mix No. | 3-4 | 3-5 | 3-6 |
|---|---|---|---|
| Asphalt | 96.88 | 96.94 | 96.94 |
| SBS Rubber | 3.00 | 3.00 | 3.00 |
| Group VIA Element - S | | | 0.06 |
| Group VIA Element - S from 30 wt. % Sodium Hydroxide | 0.06 | | |
| NaOH from 30 wt % Solution of Sodium Hydroxide | 0.06 | 0.06 | |
| 25° C. Penetration, 1/10 mm | 106 | 107 | 110 |
| Ductility @ 4° C., 5 cm/min, cm. | 64.25 | 57.00 | 71.25 |
| Elastic Recovery @ 10° C., % | 86.25 | 86.25 | 83.75 |

Aldehydes and Phenolic Resins with Mineral Acid or Base

It has been taught in the art that reactive (resol or methylol type with heat and novolac type with hexamethylenetetramine as catalyst) phenolic resins may be used alone or in combination with elements (sulfur or sulfur donors or accelerators) of Group VIA of the Periodic Table. An example of this art is U.S. Pat. No. 5,256,710 which is now disclosed here in by reference. But the inventor in U.S. Pat. No. 5,256,710 does not teach the use of aldehydes as an independent component of the phenol aldehyde resin when used alone in asphalt or in polymer modified asphalt products.

It is also known in the art that aldehydes alone may be of use in modifying asphalt. This art, in U.S. Pat. No. 3,275,585 and now included here in by reference, is disclosed in detail. But the inventors did not disclose the use of aldehydes in polymer modified asphalt nor were they disclosed in conjunction with phenol aldehyde resins for either asphalt or polymer modified asphalt compositions.

By definition novolac resins are usually cured with basic or alkaline systems such as sodium hydroxide or hexamethylenetetramine while resol resins are cured with heat or acids. This is described on page 708 in Van Nostrad Reinhold Encyclopedia of Chemistry, fourth edition, and summarized as follows: "the reaction of a phenol with an aldehyde (most commonly encountered is that between phenol and formaldehyde) leads to the formation of two classes of phenolic resins. These are Novolacs and resols. In general, these two classes of resins may be differentiated by the fact that Novolacs are prepared with an acid catalyst and substantially less than one mole of aldehyde per mole of phenol and require the addition of a curing catalyst to become thermosetting; while resols, or single-stage resins as they are commonly called, are prepared with from 1 to 3 moles of aldehyde per mole of phenol and employ a basic condensation catalyst, and are inherently thermosetting.

Also known in the art is the ability of aldehydes to dissolve phenol aldehyde resins. This feature of combining aldehydes with phenol aldehydes to dissolve one into the other would offer the artisan the advantage of a completely active liquid cross linking system. Surprisingly by incorporating the aldehyde independently, the ability of using either acid or base curing systems is allowed. This feature is shown in Table 4 below.

The data generated in Table 4 used the same asphalt and SBS rubber as Table 3 and therefore mix 3-0 and 3-1 of Table 3 may be used for comparison. The aldehyde used in the mixes in Table 4 was further. Furfural was selected for its environmentally sound features, is a renewable resource and ready availability within the chemical industry.

The SBR used in mix 4-5 and 4-6 is a typical commercial 70 wt. % anionic latex of about 23 wt. % styrene, readily available in the rubber industry and commonly used to modify asphalt. It is commonly known in the industry such laticies are made anionic and stabilized by the use of sodium hydroxide.

Surprisingly, all SBS mixes in Table 4 had higher 4° C. ductility values than Table 3 mix 3-1 at 72.75, 70.25, 72.00, 82.00 and 60.25 respectively. This is in general consistent with Table 3 data.

By comparing the 4° C. penetration of mix 4-1 with mix 4-2 in Table 4, one may observe the mineral acid, HCl, catalysed product of mix 4-2 having higher values before thin film oven test, ASTM SD 1754, TFOT and lowest after TFOT at 75 and 36 as opposed to 58 and 48 respectively. This would indicate the potential to adjust the cross linking system to fit the asphalt or bitumen as needed. Also of interest is 4° C. penetration of mix 4-3 where both before and after TFOT at 59 and 40 respectively in the toluene sulfonic acid catalyst system. But, surprisingly, the highest values for the resol with sodium hydroxide as the catalyst system of mix 4-4 with 4° C. penetration values of 97 and 43 for both before and after TFOT values respectively.

It is also note worthy that mix 4-4 had the highest 4° C. ductility value of all mixes (4-1 through 4-4) using SBS rubber.

Mix 4-5 and 4-6 are with SBR rubber without and with the resol-aldehyde-sodium hydroxide cross linking system respectively. As the SBR latex used in both mix 4-5 and 4-6 are anionic and contain sodium hydroxide, no additional sodium hydroxide was added to either mix. From the data, it would appear that additional alkali metal hydroxide is optional. The presence of the resol-aldehyde-sodium hydroxide cross linking system in mix 4-6 gave higher absolute viscosity both before and after TFOT than did mix 4-5 values.

From these teachings one of average skill in the art may now use solution (SBS) or latex polymers catalysed by mineral or organic acid or base with phenol aldehyde resins dissolved in aldehyde to achieve the best working formula for a given asphalt.

TABLE 4

Aldehyde and Novolac or Resol Phenolic Resin with Acid or Hydroxide

| Formula %/<br>Test/Mix No. | 4-1 | 4-2 | 4-3 | 4-4 | 4-5 | 4-6 |
|---|---|---|---|---|---|---|
| Asphalt | 96.73 | 96.74 | 96.74 | 96.73 | 96.93 | 96.73 |
| Rubber | 3.00 | 3.00 | 3.00 | 3.00 | 3.00 | 3.00 |
| SBS or SBR | SBS | SBS | SBS | SBS | SBR | SBR |
| Novolac Phenolic Resin | 0.10 | 0.10 | 0.10 | | | |
| Resol Phenolic Resin | | | | 0.10 | | 0.10 |
| Aldehyde - Furfural | 0.10 | 0.10 | 0.10 | 0.10 | | 0.10 |
| Hydrochloric Acid | | 0.07 | | | | |
| Sodium Hydroxide | 0.07 | | | 0.07 | 0.07 | 0.07 |
| Toluene Sulfonic Acid | | | 0.06 | | | |
| 4° C. Penetration, 1/10 mm before TFOT | 58 | 75 | 59 | 97 | 49 | 49 |
| 4° C. Penetration, 1/10 mm after TFOT | 48 | 36 | 40 | 43 | 39 | 36 |
| Ductility @ 4° C., 5 cm/min, cm before TFOT | 72.75 | 70.25 | 72.00 | 82.00 | 25.25 | 25.50 |
| Absolute Viscosity @ 60° C. P before TFOT | 6894 | 6251 | 4718 | 6207 | 3347 | 4214 |
| Absolute Viscosity @ 60° C. P after TFOT | 5716 | 8340 | 7169 | 5977 | 8717 | 13563 |

Table 5, below, teaches the utility of novalac phenol aldehyde with hexamethylenetetramine (Hexa @ 8–10 wt. %) dissolved in the aldehyde furfural without or with the presence of a cationic SBR latex in the asphalt. The cationic SBR latex is known to contain hydrochloric acid and a surfactant to convert the normally produced anionic into the cationic latex.

The data indicates that increased ductility at 4° C. may be achieved by using novalac phenolic resin dissolved in aldehyde by comparing mix 5-1 at 150.00 cm with mix 5-5 at 50.50 cm respectively. Also note the increase in elastic recovery for mix 5-1 at 62.50 and 60.00 for mix 5-5 indicating fundamental change in the product related to the cross linking system.

Surprisingly, the asphalt alone may be modified by the presence of acid, novalac phenol and aldehyde. This is observed by examination of the higher values for ring and ball softening point, ductility at 4° C. and elastic recovery for mix 5-2, 5-3 (disclosed here in) and 5-4 (known art) as opposed to mix 5-0 with low values. Interestingly, the highest ring and ball softening point (118° F.) for non rubber modified asphalt is mix 5-2 which had 0.10 wt. % hydrochloric acid added to the formula above that available from mix 5-5, the cationic latex alone.

From these teachings one of average skill in the art may now use the asphalt alone or in combination with solution (SBS) or cationic or anionic latex polymers catalysed by mineral or organic acid or base with phenol aldehyde resins dissolved in aldehyde to achieve the best working formula for a given asphalt.

TABLE 5

Aldehyde with Novalac Phenol Aldehyde Resin

| Formula %/<br>Test/Mix No. | 5-0 | 5-1 | 5-2 | 5-3 | 5-4 | 5-5 |
|---|---|---|---|---|---|---|
| Asphalt | 100.00 | 96.80 | 99.70 | 99.80 | 99.70 | 97.00 |
| Cationic SBR Rubber | | 3.00 | | | | 3.00 |
| Navalac Resin w/ Hexa | | | 0.10 | 0.10 | 0.20 | |
| Aldehyde - Furfural | | | 0.10 | 0.10 | | 0.10 |
| HCl - 20° Be | | | | 0.10 | | 0.10 |
| Ring & Ball Soft Pt., ° F. | 104 | 109 | 118 | 107 | 107 | 124 |
| Ductility @ 4° C., 5 cm/min, cm | 0 | 150 | 9.00 | 8.00 | 9.50 | 50.50 |
| Elastic Recovery @ 10° C., % | 2.50 | 62.50 | 5.00 | 5.00 | 6.25 | 60.00 |

Cross Linking Agents of the Known Art

The data presented in Table 6 addresses teaching of the known art. This data is being included for the purposes of comparisons with previous and future data related to the new and unexpected findings disclosed here in.

Data for Table 6 was generated following the previously outlined mix procedure. The asphalt of Table 6 is commercially available. Grading of the asphalt would yield a AC-5 classification.

The rubber is a styrene butadiene carboxylic acid terminated (end caped) block copolymer (SBX) of approximately 80,000 molecular weight. This polymer had about 3.0 wt. % unbound styrene of a total 15 wt. %; this is commonly called the taper section of the polymer.

In Table 6, mix 6-1 is the common practice within the asphalt industry for polymer modified asphalt; which is to introduce the polymer to the asphalt then allowing mixing, temperature and time to digest the polymer with no further processing.

Table 6 mix 6-3, mix 6-5 and mix 6-8 are made with polymer modified asphalt of bitumen, such as Butaphalt® B-720, Butaphalt® B-720 plus additional polyamine and a resol phenol aldehyde resin respectively, all of which are commercially available from Tex-Par Energy, inc. and based upon U.S. Pat. No. 5,256,710 which is disclosed here in by reference.

All other mixes shown in Table 6 are self evident as to component source, composition and prior art technology.

TABLE 6

Recognition of Known Art Cross Linking Agents

| Formula %/Test/Mix No. | 6-1 | 6-2 | 6-3 | 6-4 |
|---|---|---|---|---|
| Asphalt - AC-5 | 97.00 | 96.90 | 96.90 | 96.90 |
| Carboxylated SBX Rubber | 3.00 | 3.00 | 3.00 | 3.00 |
| Group IIA Oxide - CaO | | 0.10 | | |
| Butaphalt ® B-720 | | | 0.10 | |
| Poly Amines | | | | 0.10 |
| Group VIA Element - Sulfur | | | | |
| Carboxylic Anhydride | | | | |
| Resol Phenolic Resin | | | | |
| 4° C. Penetration, 1/10 mm | 51 | 48 | 51 | 54 |
| 25° C. Penetration, 1/10 mm | 113 | 115 | 126 | 138 |
| Ring & Ball Soft Pt., ° F. | 120 | 113 | 121 | 121 |
| Ductility @ 4° C., 5 cm/min, cm | 21.50 | 49.75 | 66.50 | 35.50 |
| Elastic Recovery @ 10° C., % | 56.25 | 65.00 | 75.00 | 86.21 |
| Absolute Viscosity @ 60° C., P | 2978 | 2564 | 2681 | 2093 |

TABLE 6-continued

| Recognition of Known Art Cross Linking Agents Separation, ΔT-B Soft. Pt., ° F. | +0.50 | −1.50 | +1.00 | −0.25 |
|---|---|---|---|---|
| Formula %/Test/Mix No. | 6-5 | 6-6 | 6-7 | 6-8 |
| Asphalt - AC-5 | 96.80 | 96.90 | 96.90 | 96.80 |
| Carboxylated SBX Rubber | 3.00 | 3.00 | 3.00 | 3.00 |
| Group IIA Oxide - CaO | | | | |
| Butaphalt ® B-720 | 0.10 | | | |
| Poly Amines | 0.10 | | | |
| Group VIA Element - Sulfur | | 0.10 | | |
| Carboxylic Anhydride | | | 0.10 | |
| Resol Phenolic Resin | | | | 0.20 |
| 4° C. Penetration, 1/10 mm | 55 | 60 | 54 | 65 |
| 25° C. Penetration, 1/10 mm | 132 | 147 | 140 | 147 |
| Ring & Ball Soft Pt., ° F. | 122 | 120 | 117 | 1120 |
| Ductility @ 4° C., 5 cm/min, cm | 84.25 | 60.50 | 50.25 | 31.50 |
| Elastic Recovery @ 10° C., % | 78.16 | 76.25 | 87.50 | 90.00 |
| Absolute Viscosity @ 60° C., P | 2745 | 2440 | 2073 | 2434 |
| Separation, ΔT-B Soft. Pt., ° F. | 0.00 | +1.00 | +0.25 | −0.25 |

Carboxylic Acid Terminated Styrene Butadiene Block Copolymers (SBX) with Phosphates, Sulfates and Known Art Cross Linking Agents The art of using phosphates or sulfates to improve compatibility is well known in the art. Examples of this art are taught in U.S. Pat. Nos. 5,070,123 and 5,095,055 and 5,189,083 and 5,348,994 and 5,225,462 and 5,228,773 all of which are included here in by reference. All these patents involve the addition of phosphates or sulfates to the polymer, the asphalt or the polymer asphalt blend or various other combinations. In U.S. Pat. Nos. 5,278,207 and 5,322,867 is taught the use of adding acrylic monomers to the asphalt, polymer (grafting) or both and further reacting with polyamine to improve compatibility or stability of the polymer in asphalt.

Now taught in this disclosure are improvements to physical properties of a polymer asphalt blend where in the polymer is a carboxylic acid terminated conjugated diene alpha or aryl-substituted olefins or vinyl aromatic polymers and cross linked with phosphates and or sulfates and or in combination with cross linking agents of known art. Table 7 teaches by example the practical application taught here in and compares to the known art in Table 6. Specifically, Table 6 mix 6-1 shows a compatible polymer asphalt mixture by having a ring and ball softening point difference or separation value of 4.00° F. or less. It is commonly known and specified by purchasing entities that a 4.00° F. or less separation value indicates a compatible polymer asphalt system. Therefore, beginning with a compatible polymer asphalt mixture, further enhancements to the final product by addition of cross linking agents known in the art and specifically in combination with phosphates and sulfates will allow one of average skill greater latitude in formulations.

In Table 7, mixes 7-1 through 7-7 are with the presence of phosphates in the formula. Mix 7-8 is with the presence of sulfates in the formulation.

In this series of data, the phosphate used is normally sold in commercial applications and known as super triple phosphate. Super triple phosphate in powder form and about 46 wt. % active was used to develop this data.

The ferrous sulfate used in the data of Table 7 is commercially available in the general formula $FeC_2H(NH_4)_2(SO_4)_2 \cdot 4(H_2O)$ in powder form.

From the data generated, Mix 7-1 is the carboxylated SBX rubber with only phosphate present in the formula. Mix 7-1 serves as a basis of comparison to mixes 7-2 through 7-7. Further, as is shown by comparison of Table 6 mix 6-1 the presence of the super triple phosphate in Table 7 mix 7-1 or the iron sulfate in Table 7 mix 7-8 increased the 4° C. and 25° C. penetration and the elastic recovery values. There was no significant change in the separation values for any of these mixes. Surprisingly, the presence of phosphates in Table 7 mix 7-2 increased the absolute viscosity over the known art example in Table 6 mix 6-6 at 3127 Poise and 2440 Poise respectively.

In mix 7-3 of Table 7 a phenolic novalac resin with hexamtehylene tetramine (about 8 wt. % based on resin) was dissolved in the aldehyde furfural at about 75 wt. % resin to 25 wt. % aldehyde before being introduced into the polymer modified asphalt which was immediately followed with the phosphate. In mix 7-4, the novalac resin was introduced to the polymer modified asphalt by pre mixing the resin with the phosphate; the mixture then added to the container. The results indicate no significant difference between the liquid or powder phenolic resin addition and therefore they may be exchanged as desired.

Mix 7-5 utilized the catalyst dibutyl tin dilaurate. Dibutyl tin dilaurate is commonly used in urethane or phosphate type chemical reactions. Comparing values of mix 7-1 with mix 7-5 indicate no significant change in values. Therefore, except for the potential to speed process time, there would be no unexpected differences is use of catalysts similar to dibutyl tin dilaurate.

Mix 7-6 and mix 7-7 of Table 7 indicate the dramatic effect the use of phosphalts may have on a polymer modified asphalt at high use levels. It is surprising that the 4° C. penetration and softening point would be significantly higher for mix 7-7 over that of mix 7-6 at 76 with 280° F. and 60 with 227° F. respectively. The product of mix 7-7 may have potential in roofing applications.

From these for going teachings, one of average skill in the art may now utilize chemical moieties of Group V-A and or Group VIII-B elements of the Periodic Table of the Elements or the Aluminum—Iron Group elements as defined by *Qualitative Analysis and Chemical Equilibrium*, fifth edition, Copyright 1966 by authors T. R. Hogness, et al., published by Holt, Finehare and Winston, Inc. and incorporated here in by reference in their oxide and or sulfate forms to formulate polymer modified asphalt products.

TABLE 7

Phosphates, Sulfates and Known Art Cross Linking Agents with SBX Polymers

| Formula %/Test/Mix No. | 7-1 | 7-2 | 7-3 | 7-4 |
|---|---|---|---|---|
| Asphalt - AC-5 | 96.90 | 96.80 | 96.767 | 96.80 |
| Carboxylated SBX Rubber | 3.00 | 3.00 | 3.00 | 3.00 |
| Ferrous Sulfate | | | | |
| Dibutyl Tin Dilaurate | | | | |
| Aldehyde - Furfural | | | 0.033 | |
| Group VIA Element - Sulfur | | 0.10 | | |
| Resol Phenolic Resin | | | 0.099 | |
| Navalac Resin w/ Hexa | | | | 0.10 |
| Phosphate | 0.10 | 0.10 | 0.100 | 0.10 |
| 4° C. Penetration, 1/10 mm | 63 | 63 | 55 | 56 |
| 25° C. Penetration, 1/10 mm | 144 | 125 | 139 | 142 |
| Ring & Ball Soft Pt., ° F. | 120 | 126 | 120 | 121 |
| Ductility @ 4° C., 5 cm/min, cm | 23.00 | 60.25 | 44.5 | 44.25 |
| Elastic Recovery @ 10° C., % | 83.75 | 78.75 | 82.50 | 83.75 |
| Absolute Viscosity @ 60° C., P | 2078 | 3127 | 2295 | 2213 |
| Separation, ΔT-B Soft. Pt., ° F. | −1.00 | +1.25 | −0.25 | +0.25 |
| Formula %/Test/Mix No. | 7-5 | 7-6 | 7-7 | 7-8 |
| Asphalt - AC-5 | 96.89 | 75.00 | 72.00 | 96.80 |
| Carboxylated SBX Rubber | 3.00 | 25.00 | 25.00 | 3.00 |

TABLE 7-continued

Phosphates, Sulfates and Known Art Cross Linking Agents with SBX Polymers

| | | | | |
|---|---|---|---|---|
| Ferrous Sulfate | | | | 0.20 |
| Dibutyl Tin Dilaurate | 0.01 | | | |
| Aldehyde - Furfural | | | | |
| Group VIA Element - Sulfur | | | | |
| Resol Phenolic Resin | | | | |
| Navalac Resin w/ Hexa | | | | |
| Phosphate | 0.10 | | 3.00 | |
| 4° C. Penetration, 1/10 mm | 60 | 60 | 76 | 60 |
| 25° C. Penetration, 1/10 mm | 142 | 60 | 68 | 139 |
| Ring & Ball Soft Pt., ° F. | 115 | 227 | 280 | 120 |
| Ductility @ 4° C., 5 cm/min, cm | 21.75 | 39.00 | 51.00 | 24.50 |
| Elastic Recovery @ 10° C., % | 83.75 | | | 83.75 |
| Absolute Viscosity @ 60° C., P | 1850 | | | 2185 |
| Separation, ΔT-B Soft. Pt., ° F. | −0.50 | | | +0.75 |

Carboxylic Acid Terminated Styrene Butadiene Block Copolymers (SBX) with Group II-A and Group VI-A Elements of the Periodic Table and Resol Resins As previously disclosed and incorporated here in by reference, the paper entitled "The Vulcanization of Butyl Rubber with Phenol Formaldehyde Derivatives" by P. O. Tawney, J. R. Little and P. Viohl and presented at the Division of Rubber Chemistry meeting of the American Chemical Society on May 14–16, 1958 in Cincinnati, Ohio teaches that Group IV-A salts of Group I-A Elements of the Periodic Table (stannous chloride dihydrate) will resist revision. The direct application of this art is shown in Table 8, mix 8-3 below and FIG. 1 attached. In comparison to the known art as shown in Table 6 mix 6-1 which has no Group IV-A element in its formula, mix 8-3 gave the unexpected results of increasing both the 4° C. and 25° C. penetration at 51 and 113 for mix 6-1 compared to 58 and 135 in mix 8-3 respectively. FIG. 1 refers to the force ductility results of mix 6-1 and mix 8-3 which indicate that the presence of the Group IV-A salt of Group VII-A elements of the Periodic Table of Elements, stannous chloride dihydrate surprisingly decreased the initial peak and total elongation in mix 8-3.

Unexpected were the results of mix 8-1 indicating the presence of Group II-A salts of Group VII-A elements of the Periodic Table of Elements (calcium chloride) give nearly the same 4° C. and 25° C. penetration values as mix 8-3 at 58 and 135 for mix 8-1 comparing to 61 and 137 for mix 8respectively.

Upon further observation of FIG. 1, the force ductility elongation of mix 8-2 is greater than mix 8-3 and approaching mix 6-1 elongation values. The increased length is likely related to the substitution of calcium chloride in mix 8-2 for stannous chloride dihydrate in mix 8-3 formulations.

Figure 2:
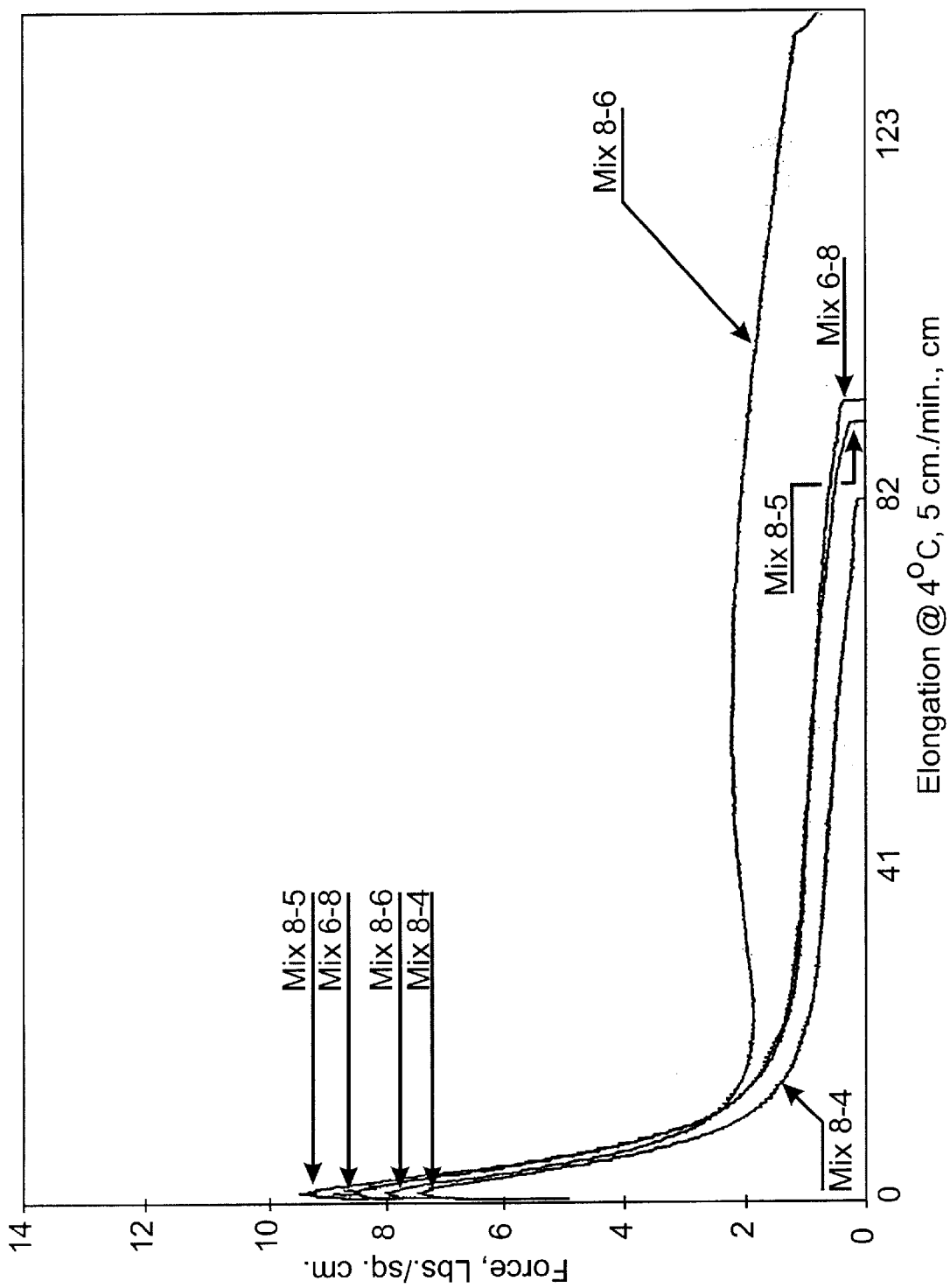

When a sulfate of a metal such as Group II-A elements of the Periodic Table of Elements are included into the formulation as shown in mix 8-4, the physical values are not near those of mix 6-8 of the known art except for ductility which is at 20.50 for mix 8-4 and 31.50 for mix 6-8 respectively. FIG. 2 shows that the force ductility elongation is not as great for mix 8-4 as that of mix 6-8 respectfully.

But, when the same levels of magnesium sulfate, calcium chloride and resol phenolic resin are added to the formulation as in mix 8-5, the physical values are relative close to mix 6-8 values. This is further observed in FIG. 2 force ductility elongation values.

Surprisingly, when a relatively small amount of the Group VI-A element (sulfur) of the Periodic Table of Elements is added to the formulation as in mix 8-6, the physical values of the mix are changed. Such changes in physical values may be compared to Table 8 mix 8-5 and Table 6 mix 6-6 and mix 6-8 of the known art. By comparison, mix 8-6 has the lowest 4° C. and 25° C. penetration, the highest ring and ball softening point, greatest ductility at 4° C. and highest absolute viscosity of the three mixes. Also surprising is that mix 8-6 has the greatest force ductility elongation with the second lowest peak, as FIG. 2 illustrates, for all Table 8 mixes.

Accordingly, the above combination of chemical moieties now taught and disclosed herein may constitute some form of a complex oxidation—reduction (commonly called redox) reaction involving non-metal ions. It is known that redox reactions of this nature are often recognized as a bimolecular nucleophilic displacement reaction commonly called a $S_N2$ reaction in organic chemistry. A more detailed discussion of these reactions may be found in *Quantitative Analytical Chemistry*, second edition, third printing of May 1971, copyright 1969 by Allyn and Bacon, Inc., 470 Atlantic Avenue, Boston, Mass. by James S. Fritz and George H. Schenk, Jr., pp. 259–261 and *Organic Chemistry*, second edition, tenth printing August 1971, copyright 1966 by Allyn and Bacon, Inc., 470 Atlantic Avenue, Boston, Mass. by Robert T. Morrison and Robert N. Boyd, pp. 470–475 respectfully and now included herein by reference.

From the above it is now obvious to one of average skill in the art that oxidation—reduction reactions may be useful in modifying asphalt or bitumen or polymer or rubber or combinations of these to create new and novel products for industrial applications.

TABLE 8

Group IIA & Group VI-A Elements of Periodic Table in Cross Linking System

| Formula %/Test/Mix No. | 8-1 | 8-2 | 8-3 | 8-4 |
|---|---|---|---|---|
| Asphalt - AC-5 | 96.60 | 96.80 | 96.80 | 96.60 |
| Carboxylated SBX Rubber | 3.00 | 3.00 | 3.00 | 3.00 |
| Resol Phenolic Resin | | 0.10 | 0.10 | |
| Magnesium Sulfate | | | | 0.20 |
| Stannous Chloride Dihydrate | | | 0.10 | |
| Calcium Chloride | 0.10 | 0.10 | | 0.20 |
| Group VIA Element - Sulfur | | | | |
| 4° C. Penetration, 1/10 mm | 58 | 61 | 59 | 66 |
| 25° C. Penetration, 1/10 mm | 135 | 137 | 131 | 152 |
| Ring & Ball Soft Pt., ° F. | 120 | 119 | 120 | 122 |
| Ductility @ 4° C., 5 cm/min, cm | 23.75 | 24.00 | 18.50 | 20.50 |
| Absolute Viscosity @ 60° C., P | 2387 | 2206 | 2396 | 2173 |

| Formula %/Test/Mix No. | 6-8 | 8-5 | 8-6 |
|---|---|---|---|
| Asphalt - AC-5 | 96.80 | 96.40 | 96.38 |
| Carboxylated SBX Rubber | 3.00 | 3.00 | 3.00 |
| Resol Phenolic Resin | 0.20 | 0.20 | 0.20 |
| Magnesium Sulfate | | 0.20 | 0.20 |
| Stannous Chloride Dihydrate | | | |
| Calcium Chloride | | 0.20 | 0.20 |
| Group VIA Element - Sulfur | | | 0.02 |
| 4° C. Penetration, 1/10 mm | 65 | 59 | 56 |
| 25° C. Penetration, 1/10 mm | 147 | 135 | 122 |
| Ring & Ball Soft Pt., ° F. | 120 | 125 | 127 |
| Ductility @ 4° C., 5 cm/min, cm | 31.50 | 31.00 | 79.50 |
| Absolute Viscosity @ 60° C., P | 2434 | 2580 | 4724 |

In the following work, unless other wise noted, all the cross linking agents were introduced into a 15 wt. % concentrate of the carboxylated SBX polymer and allowed to react for about 4 hours. The reacted product was then diluted and mixed for approximately one hour at the final concentrations shown in Table 9 below.

The asphalt used in the development of data for Table 9 is a typical 120 to 150 penetration grade asphalt that would commonly be used in the asphalt industry. Therefore, Table 9 mix 9-1 is known art similar to mix 6-1 of Table 6 differing in the grade of asphalt. As a result, Table 9 mix 9-1 may serve as a comparison to the other mixes of the table.

Figure 3:
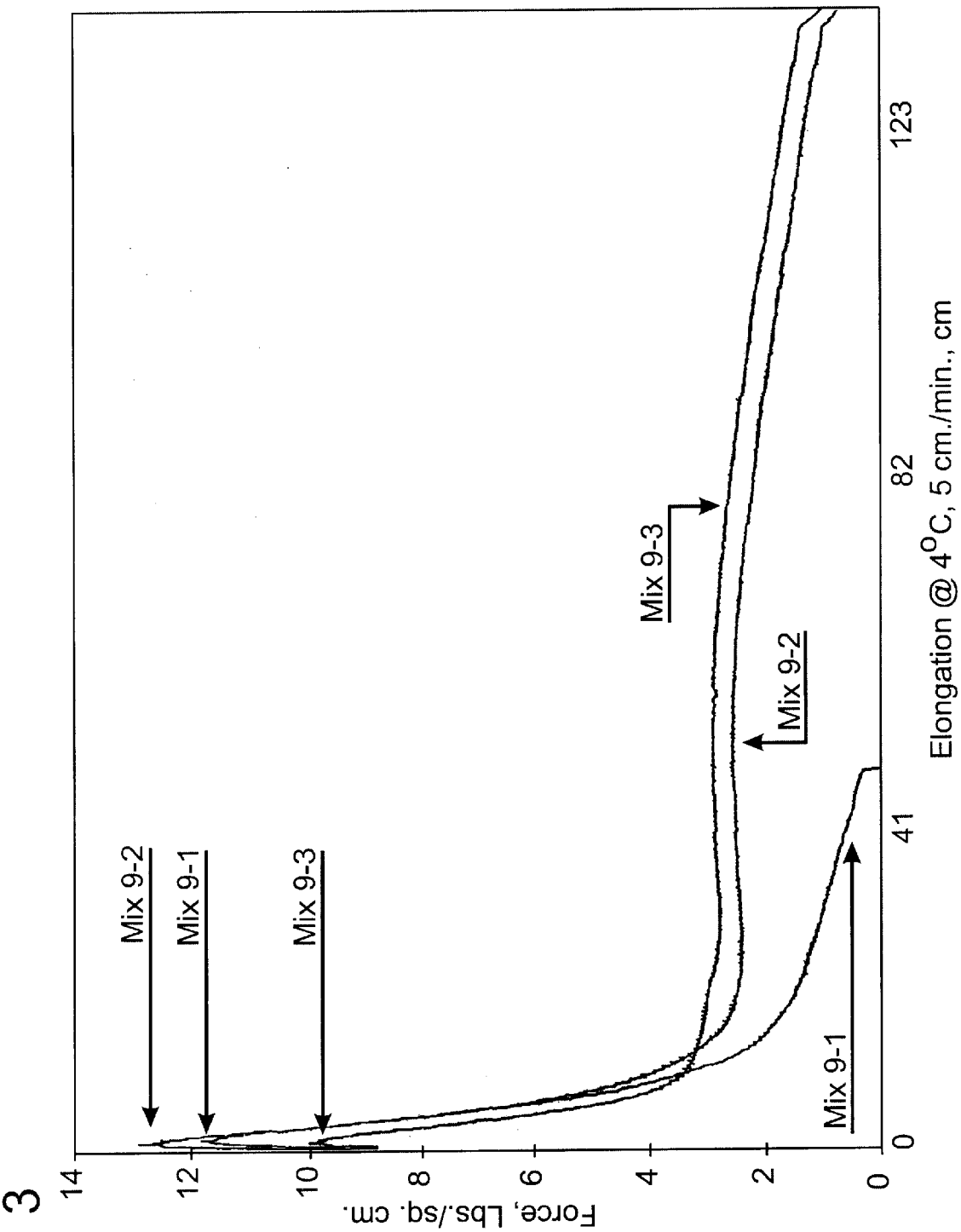

From the data in Table 9, mix 9-2 and mix 9-3 compare the effects of substituting potassium chloride for calcium chloride respectively. Both the formulas have greater ductility than that of mix 9-1 at 46.00, 62.25 and 16.00 respectively. Mix 9-2 indicates a tougher material by having the highest initial peak and higher force values than either mix 9-1 or 9-3 as shown in FIG. 3 force ductility. But, mix 9-2 has lower force values than mix 9-3 as the extension increases. This indicates that there now exists a method of controlling, by selection of the Group I-A or Group VII-A element of the Periodic Table of Elements or the Halide Group of Negative Ions as defined in *Qualitative Analysis and Chemical Equilibrium*, fifth edition, 1966, Holt, Rinehart and Winston, Inc., p. 490 Table 23.2, by T. R. Hogness, et al. and included here in by reference, with Group II-A elements of the Periodic Table of Elements the shape and associated force values of a tensile strength elongation type test such as force ductility which had here to for been non existent.

Another interesting observation from the data of mix 9-2 and 9-3 is that mix 9-3 has greater ductility values for slightly lower penetration and higher ring and ball soft point values than mix 9-2 at 62.25 cm., 43, 107 and 126° F. as opposed to 47.00 cm., 45, 110 and 124° F., respectively.

Figure 4:
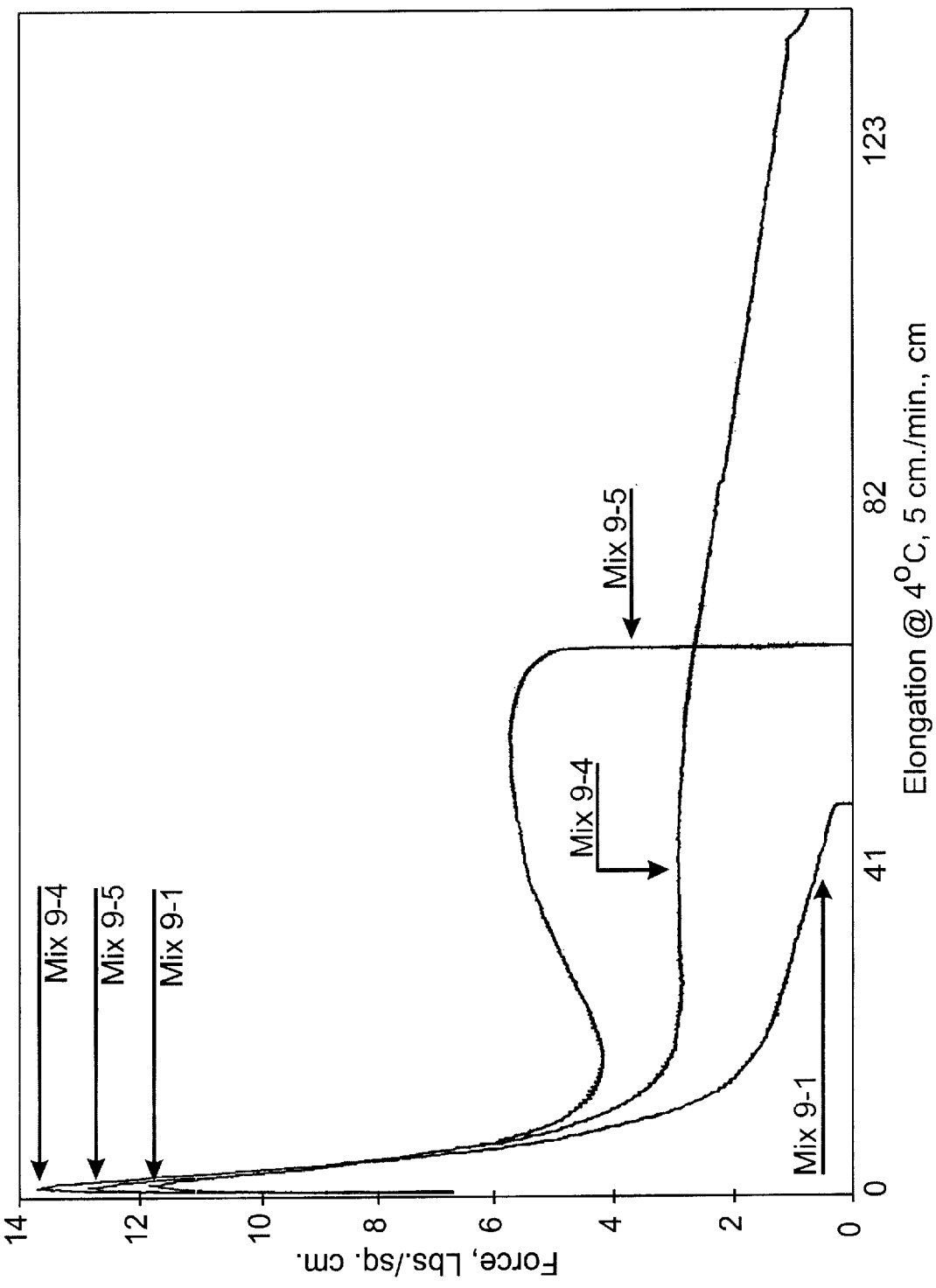

FIG. 4 mix 9-4 illustrates the effect of changing the metal portion of both the sulfate and chloride in the cross linking system. In this example, the metal sulfate was ferrous sulfate while the chloride was ferric chloride. Mix 9-4 has use levels at half those of mix 9-2 and mix 9-3 at 0.02 and 0.04 wt. % to 0.04 and 0.08 wt. %, respectively. Surprisingly, the penetrations are the lowest of all mixes in Table 9 at 38 and 97 units respectively.

Also in FIG. 4 is the effect of a all liquid system of mix 9-5 on the force ductility curve. Also note that the naturally occurring phenolic resin Quebracho (which is a member of the chemical group known as Tannin) is substituted for part of the resol phenolic resin both of which have been dissolved in furfural. It is surprising that the shape of the force ductility curve has changed significantly from the previous forms illustrated from Table 9 formulas in that there exists a significant second increase in stiffness and the shortest elongation value.

TABLE 9

Iron & Liquid Cross Link System

| Formula %/Test/ Mix No. | 9-1 | 9-2 | 9-3 | 9-4 | [1]9-5 |
|---|---|---|---|---|---|
| Asphalt - 120/150 pen | 97.00 | 96.82 | 96.82 | 96.90 | 96.46056 |
| Carboxylated SBX Rubber | 3.00 | 3.00 | 3.00 | 3.00 | 3.00 |
| Magnesium Sulfate | | 0.04 | 0.04 | | |
| Ferrous Sulfate | | | | 0.02 | [4]0.04614 |
| Potassim Chloride | | 0.08 | | | |
| Calcium Chloride | | | 0.08 | | [4]0.0923 |
| Ferric Chloride | | | | 0.04 | |
| Group VIA Element - Sulfur | | 0.02 | 0.02 | 0.02 | [2]0.045 |
| Resol Phenolic Resin | | 0.04 | 0.04 | 0.02 | [3]0.09 |
| Phenolic Resin - Quebracho | | | | | [3]0.09 |
| Aldehyde - Furfural | | | | | [3]0.12 |
| Sodium Hydroxide | | | | | [2]0.056 |
| 4° C. Penetration, 1/10 mm | 55 | 45 | 43 | 38 | 39 |
| 25° C. Penetration, 1/10 mm | 127 | 110 | 107 | 97 | 98 |
| Ring & Ball Soft Pt., ° F. | 121 | 124 | 126 | 127 | 127 |
| Ductility @ 4° C., 5 cm/min, cm | 16.00 | 46.00 | 62.25 | 49.75 | 40.50 |
| Absolute Viscosity @ 60° C., P | 2519 | 4196 | 4581 | 3995 | 3967 |

[1]Solution chemicals added at given concentration, no concentration and dilution step.
[2]Added as 0.225% of 25% NaOH, 20% Sulfur and 55% water solution.
[3]Added as 0.300% of 40% Furfural, 30% Resol Phenolic Resin and 30% Quebracho solution
[4]Added as 0.600% of 7.69% Ferrous Sulfate, 15.38% Calcium Chloride & 76.97% water solution The data of Table 10 teach that rather high amounts of carboxylated SBX rubber may be used with relatively high amounts of metal sulfates, chlorides, resol phenolic resins and in conjunction with a liquid system comprised of gelatin and water. Mix 10-1 illustrates the teachings of high rubber content while mix 10-2 teaches high cross linking use levels. Mix 10-3 teaches that a liquid cross linking agent may be formed by dissolution of the various sulfates, chlorides, phenol resins and Group VI-A Elements in a solution of gelatin and water. Upon closer examination of the data of mix 10-3, one would observe that a 100 penetration value at 25° C. is surprisingly low compared to the initial starting asphalt minimum (by definition of range) penetration value of 120 units. This indicates that the cross linking system will modify asphalt alone or in the absence of any significant polymer level in a polymer modified asphalt formulation.

Also shown in Table 10 is mix 10-4 which teaches the utility of an ambient temperature accelerator in the formulation. Mix 10-4 was conducted at a concentration of 3.00 wt. % rubber and used only 0.005 wt. % ambient temperature accelerator reacted at 125° C. (about 257° F.) under agitation for about 4 hours before being stored in an oven for testing the next day. Unexpected was the absolute viscosity at 8338 Poise. Also surprising is that the ring and ball softening point is higher than any data presented in Table 6, Table 7, Table 8 or Table 9 at 132° F. for mix 10-4. would indicate that a vulcanization catalyst, whether sulfur donor or not, would contribute to higher or more pronounced changes in the universal cross linking system than without such a accelerator in the formulation.

The concept of a catalyst system which is not a sulfur donor is illustrated in Table 10 mix 10-5 and mix 10-6 below. In both mix 10-5 and mix 10-6 the polymer was dissolved in or digested by the asphalt at less than 125° C. followed by pre blended magnesium sulfate, calcium chloride and Group VI-A Element—Sulfur before their addition to the asphalt and polymer mixture. Mix 10-5 differed from mix 10-6 in that mix 10-5 contains the Carboxylated SBX Rubber previously used in this disclosure. The Non Carboxylated SB Rubber of mix 10-6 is commercially available from a number of sources and has about an 80,000 molecular weight, about 23.5 wt. % total styrene and about 15.0 wt. % bound or block styrene. The Non Carboxylated SB Rubber is commonly known to be called a linear tapered di block styrene butadiene polymer. Therefore, mix 10-5 would compare not only with mix 10-4 but also Table 6 mix 6-1 and mix 6-6 of known art cross linking agents. Mix 10-6 compares to Table 6 mix 6-6 in a more indirect manner as the polymer is not the same.

It is surprising then that mix 10-5 has the higher absolute viscosity of mix 6-1 and mix 6-6 at 7307 P. and 2978 P. and 2440 P. respectively. In comparison to mix 10-4 (with an absolute viscosity of 8338 P.) the absolute viscosity of mix 10-5 at 7307 P. is relatively closer than that of the known art cross linking agents. This is also true of the softening point at 131° F. for mix 10-5, 120° F. for mix 6-1 and 120° F. for mix 6-6 respectfully.

The data of mix 10-6 indicates the surprising results of a higher absolute viscosity from that of the known art cross linking agents. By observation of the absolute viscosity, for example, in Table 6 mix 6-1 and mix 6-6 and mix 10-6 at values of 2978 P. and 2440 P. and 4160 P. respectfully higher values will result in the addition of metal sulfates and metal chlorides to the asphalt polymer blend in the presence of Group VI-A elements.

From the for going, it is now known and taught here in that the use of Group I-A, Group II-A, Group VIII-B or other elements as sulfates and Group I-A, Group II-A or other elements as salts of Group VII-A elements in combination with elements of Group VI-A of the Periodic Table of Elements will accelerate and enhance cross linking or vulcanization.

TABLE 10 max/min & liquid system

| Formula %/Test/Mix No. | 10-1 | 10-2 | 10-3 |
|---|---|---|---|
| Asphalt - 120/150 pen | 74.55 | 97.00 | 99.082 |
| Non Carboxylated SB Rubber | | | |
| Carboxylated SBX Rubber | 25.00 | 0.50 | |
| Magnesium Sulfate | 0.10 | 0.50 | *0.10 |
| Potassim Chloride | 0.20 | | |
| Calcium Chloride | | 1.00 | *0.20 |
| Group VIA Element - Sulfur | 0.05 | 0.50 | *0.05 |
| Resol Phenolic Resin | 0.10 | 0.50 | *0.10 |
| 250 Bloom Gelatin | | | *0.01 |
| Ambient Temp. Accelerator | | | |
| 4° C. Penetration, 1/10 mm | 82 | 32 | 35 |
| 25° C. Penetration, 1/10 mm | 72 | 76 | 100 |
| Ring & Ball Soft Pt., ° F. | 225 | 126 | 115 |
| Ductility @ 4° C., 5 cm/min, cm | | 5.00 | 6.00 |
| Absolute Viscosity @ 60° C., P | | 3543 | 1615 |

TABLE 10-continued max/min & liquid system

| Formula %/Test/Mix No. | 10-4 | 10-5 | 10-6 |
|---|---|---|---|
| Asphalt - 120/150 pen | 96.095 | 96.30 | 96.30 |
| Non Carboxylated SB Rubber | | | 3.00 |
| Carboxylated SBX Rubber | 3.00 | 3.00 | |
| Magnesium Sulfate | 0.20 | 0.20 | 0.20 |
| Potassim Chloride | | | |
| Calcium Chloride | 0.40 | 0.40 | 0.40 |
| Group VIA Element - Sulfur | 0.10 | 0.10 | 0.10 |
| Resol Phenolic Resin | 0.20 | | |
| 250 Bloom Gelatin | | | |
| Ambient Temp. Accelerator | 0.005 | | |
| 4° C. Penetration, 1/10 mm | 43 | 42 | 45 |
| 25° C. Penetration, 1/10 mm | 93 | 105 | 107 |
| Ring & Ball Soft Pt., ° F. | 132 | 131 | 127 |
| Ductility @ 4° C., 5 cm/min, cm | 40.00 | 43.75 | 36.25 |
| Absolute Viscosity @ 60° C., P | 8338 | 7307 | 4160 |

*Added as 0.918% solution of 11.111% Magnesium Sulfate, 22.222% Calcium Chloride, 11.111% Resol Phenol Resin, 5.555% Sulfur, 1.000% 250 Bloom Gelatin, 49.000% Water Resol Phenolic Resin, 5.555% Sulfur, 1.000% 250 Bloom Gelatin, 49.000% Water Data presented in Table 11 teaches that the polymer source for the cross linking system may be of low molecular weight and or liquid at ambient temperatures. All the mixes of Table 11 were made at the concentration given in the table. There was no concentrate formed or diluted. Typical of such polymers are carboxylated liquid poly butadienes such as taught in mix 11-1. It is also important to note that the cross linking system was an all liquid component system. This allows one of average skill in the art to utilize a completely liquid polymer and cross linking system to modify asphalt. The data of mix 11-2 teaches that low molecular weight polybutenes may be used to create a modified asphalt. Mix 11-3 teaches the use of liquid hydroxylated poly butadiene resin rubbers may be successfully used with the now disclosed cross link agent.

Data of mix 11-4 and 11-5 teach that the cross linking agent disclosed here in may successfully be used with natural latex polymers. In this example the natural latex is commercially available high ammonia natural latex. Interestingly, these two mixes have significant differences in their physical properties. An example of these differences is in the increase in penetrations when the cross linking agent is added to mix 11-5 giving 46 and 110 units of mix 11-5 against 42 and 103 units 4 at 4° C. and 25° C. respectively. Surprisingly, the softening point and absolute viscosity are higher and lower respectively for mix 11-5 than the mix 11-4 values. As noted in the foot notes of Table 11, the cross linking agent was a water dispersion or liquid system.

TABLE 11

Different Polymers and All Liquid System

| Formula %/Test/Mix No. | 11-1 | 11-2 | 11-3 | 11-4 | 11-5 |
|---|---|---|---|---|---|
| Asphalt-120/150 pen | 96.64 | 94.75 | 96.08 | 97.00 | 96.08 |
| Carboxylated Liquid Poly BD | 3.00 | | | | |
| Liquid Polybutene | | 0.75 | | | |
| Hydroxylated Liquid Poly BD | | | 3.00 | | |
| High Ammonia Natural Latex | | | | 3.00 | 3.00 |
| Magnesium Sulfate | [1]0.04 | 1.00 | [5]0.10 | | [5]0.10 |
| Calcium Chloride | [2]0.08 | 2.00 | [5]0.20 | | [5]0.20 |

TABLE 11-continued

Different Polymers and All Liquid System

| Formula %/Test/Mix No. | 11-1 | 11-2 | 11-3 | 11-4 | 11-5 |
|---|---|---|---|---|---|
| Group VIA Element - Sulfur | [3]0.02 | 0.50 | [5]0.05 | | [5]0.05 |
| Resol Phenolic Resin | [4]0.15 | 1.00 | [5]0.10 | | [5]0.10 |
| Aldehyde - Furfural | [4]0.05 | | | | |
| Sodium Hydroxide | [3]0.02 | | | | |
| 250 Bloom Gelatin | | | [5]0.01 | | [5]0.01 |
| 4° C. Penetration, 1/10 mm | 51 | 34 | 49 | 42 | 46 |
| 25° C. Penetration, 1/10 mm | 148 | 79 | 129 | 103 | 110 |
| Ring & Ball Soft Pt., ° F. | 113 | 121 | 113 | 115 | 120 |
| Ductility @ 4° C., 5 cm/min, cm | 10.75 | 4.75 | 8.50 | 12.00 | 21.25 |
| Absolute Viscosity @ 60° C., P | 1093 | 2866 | 1397 | 2381 | 1397 |

Figure 5:
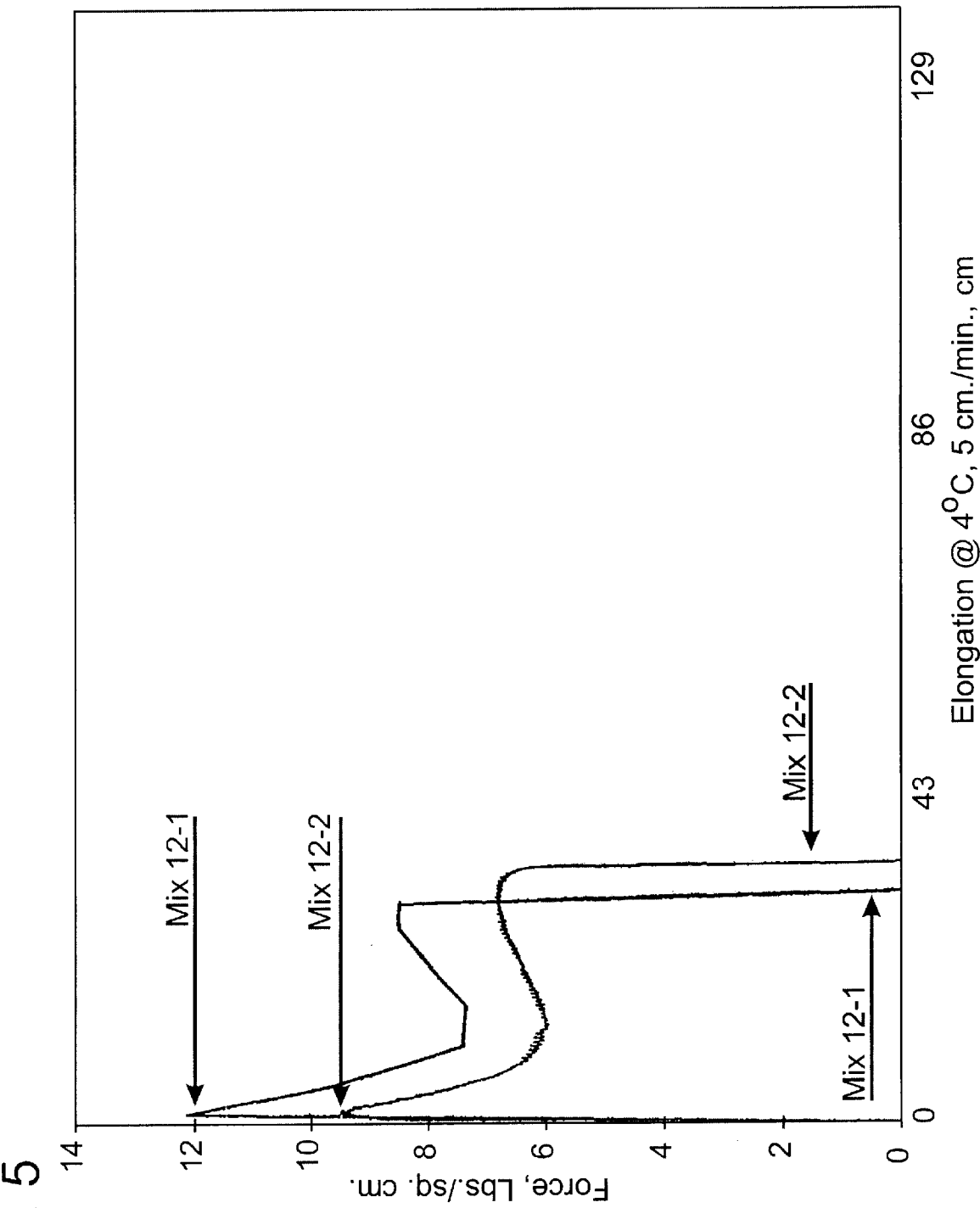

[1] Added from 10 wt. % solution in water
[2] Added from XX wt. % solution in water
[3] Added from 75 wt. % Resol Phenolic Resin dissolved in 25 wt. % Aldehyde - Furfural
[4] Added as 20 wt. % Sulfur dissolved in 20 wt % Sodium Hydroxide and 60 wt. % Water Solution
[5] Added as 0.918% solution of 11.111% Magnesium Sulfate, 22.222% Calcium Chloride, 11.111% Resol Phenolic Resin, 5.555% Sulfur, 1.000% 250 Bloom Gelatin, 49.000% Water The data of Table 12 further illustrates the wide variety of polymer types that may be cross linked by the cross linking agent disclosed here in as a universal cross linking agent. In Table 12, the polymer used in mix 12-1 and 12-2 is a commercially available copolymer of ethylene, methyl acrylate and acrylic acid commonly known in the art as EMAAA resin or acid ter polymers. The EMAAA used may be described as having a melt index of 6 g/10 min.; a density of 0.951 grams per cubic centimeter; a softening point of about 75° C.; a Shore D hardness of about 28 and a elongation percent at break of 2000 percent. By comparing the data of mix 12-1 with no universal cross linking agent to mix 12-2 which has the universal cross linking agent, one may find mix 12-2 with the absolute viscosity and elastic recovery to be of higher value. Also shown in FIG. 5 is the force ductility for each mix. By observation it is apparent that mix 12-2 has a lower initial peak with greater elongation than does mix 12-1 which has no universal cross linking agent present in its formulation.

Figure 6:
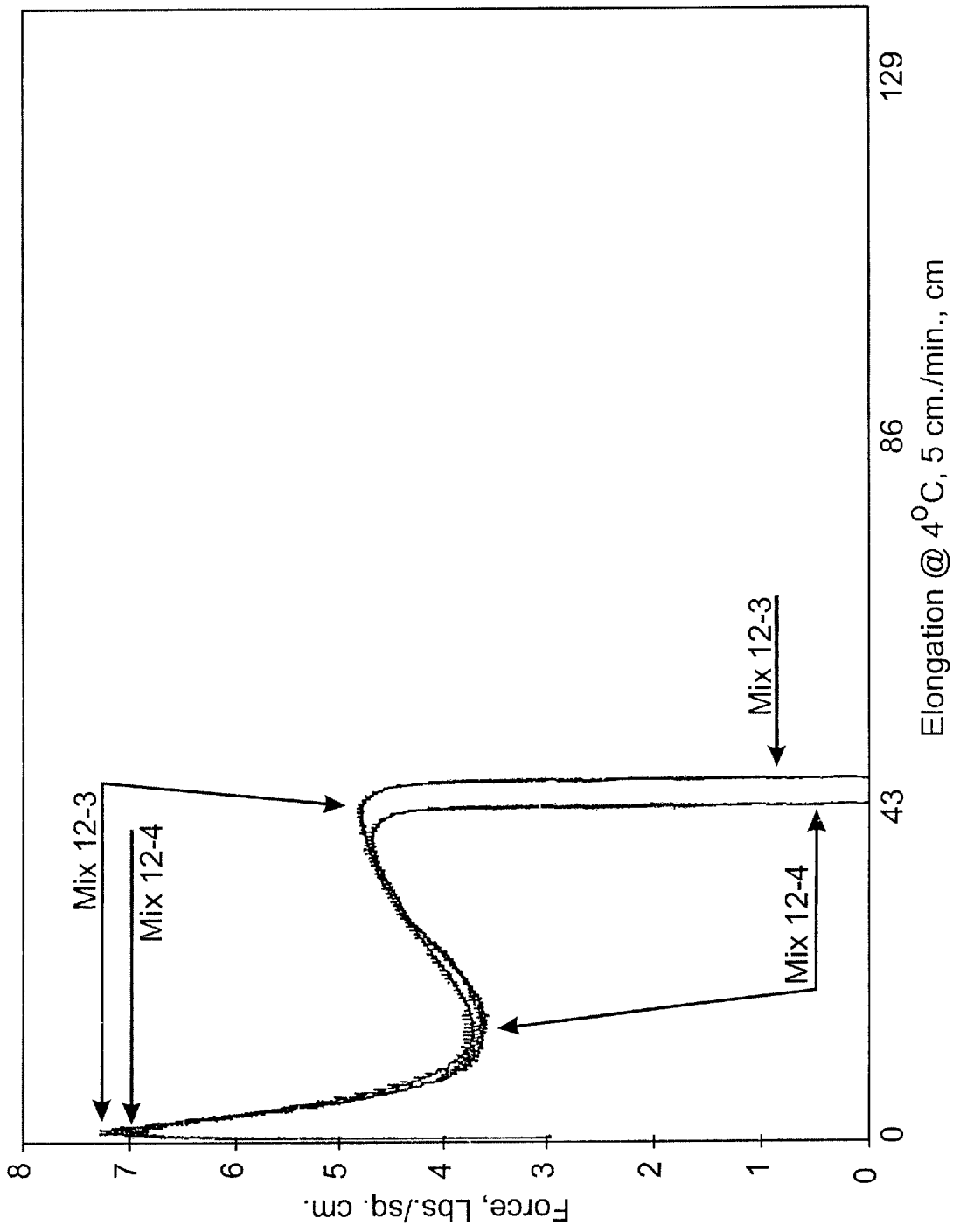

The data of mix 12-3 and mix 12-4 was developed using a polymer of ethylene and vinyl acetate. These copolymers are commonly known in the industry as EVA polymers. This particular polymer had a melt flow of 50 grams per minute; density of 0.957 grams per cubic centimeter; softening point of 240° F.; Shore A hardness of 67 and % elongation at bread of 900 percent. As can be seen in Table 12, the presence of the universal cross linking agent in mix 12-4 makes a substantial and surprising increase in elastic recovery values at 0.00% for mix 12-3 and 20.00% for mix 12-4 respectively. As observed in FIG. 5 and seen again in FIG. 6, mix 12-4 which has no universal cross linking agent has the initial higher peak value than mix 12-3 which contains the universal cross linking agent. Surprisingly, mix 12-4 has the lower value elongation. This may be due to the need for more universal cross linking agent or a need for a softer starting asphalt or any other number of adjustments to a formula as one of average skill in the art may envision within the purview of this disclosure.

TABLE 12

X-Link with EVA types

| Formula %/Test/Mix No. | 12-1 | 12-2 | 12-3 | 12-4 |
|---|---|---|---|---|
| Asphalt - AC-5 | 97.00 | 96.82 | 97.00 | 96.82 |
| EMAAA Ter Polymer | 3.00 | 3.00 | | |
| EVA | | | 3.00 | 3.00 |
| Magnesium Sulfate | | 0.04 | | 0.04 |
| Calcium Chloride | | 0.08 | | 0.08 |
| Ferric Chloride | | | | |
| Group VIA Element - Sulfur | | 0.02 | | 0.02 |
| Resol Phenolic Resin | | 0.04 | | 0.04 |
| 4° C. Penetration, 1/10 mm | 52 | 47 | 72 | 64 |
| 25° C. Penetration, 1/10 mm | 150 | 121 | 205 | 187 |
| Ring & Ball Soft Pt., ° F. | 123 | 127 | 112 | 114 |
| Ductility @ 4° C., 5 cm/min, cm | 16.00 | 14.50 | 27.00 | 27.25 |
| Elastic Recovery @ 10° C., % | 42.50 | 55.00 | 0.00 | 20.00 |
| Absolute Viscosity @ 60° C., P | 1238 | 2045 | 798 | 950 |

Carbohydrates with Asphalt in the Presence of Universal Cross Linking Agent

Mix 13-2 teaches that carbohydrates as defined in Organic Chemistry, second edition, tenth printing August 1971, copyright 1966 by R. T. Morrison and R. N. Boyd, pp. 982–983 and included here in by reference, may also be used as a polymeric material for modification of asphalt in the presence of the universal cross linking agent. As so defined, cellulose, starch, glycogen or monosaccharide or disaccharide moieties may be successfully used to modify asphalt in the presence of the universal cross linking agent disclosed here in.

Mixes of Table 13 were made by the general method with no concentration step. All formulations were made at the given concentrations of components.

Mix 13-2 was made with the gelatine, sulfate, chloride and resol phenolic resin combined and added to the asphalt. This was followed immediately with 1.0 wt. % water. The mixture was allowed to boil off the water and continue mixing for about 8 hours before being stored in the oven overnight before testing. In mix 13-2 gelatin of 250 bloom is used as the carbohydrate source. Surprisingly, the absolute viscosity is increased from 1179 Poise in the control asphalt shown in Table 13 mix 13-1 to 6247 Poise in mix 13-2 which contains the universal cross linking agent.

Mix 13-3 was made by adding the corn starch solution followed by the E-4189 (a registered trademark and product of Akzo-Nobel, Chicago, Ill.), a primary diamene surfactant known to make cationic rapid set emulsions then the balance of the components having been pre blended. The mixture was allowed to react for at least four hours before being stored in the oven over night before testing. Upon examination of the mixture the next day, there appeared to be a continuing evolution of gases. As a result, the mixture was mixed an additional 4.5 hours, the container resealed and placed in the oven over night for testing the next day. Results indicate that there is a substantial increase in absolute viscosity increased to 2721 Poise from 1179 Poise in mix 12-1.

In Mix 13-4, the phosphate solution was added first and allowed to mix about 30 minutes. This was followed by the balance of the components which were pre blended then added to the asphalt. Surprisingly, the absolute viscosity is 8295 Poise in mix 13-4 as compared to mix 13-1 with 1179 Poise.

Mix 13-5 had the corn starch and tannic acid (a naturally occurring phenolic resin of the tannin group of chemicals) pre blended and added first. Immediately following was the ammonium nitrate in water solution. The mixture was allowed to mix about 10 minutes before the addition of the preblended sulfate, chloride and resol phenolic resin were added. The mixture was allowed to react for about 1.5 hours before being stored in the oven for testing the next day. Results indicate that mix 13-5 increased in absolute viscosity to 2088 Poise from mix 13-1 absolute viscosity of 1179 Poise.

Mix 13-6 had the phosphate and tannic acid added in pre blended dry form first. About 20 minutes later the corn starch and glycerin water solution was added and allowed to mix for about one hour. Lastly the pre blended sulfate, chloride, resol phenolic resin and sulfur were added to the mixture and allowed to mix about 6 hours before being stored in the oven over night before testing. Results indicate the absolute viscosity increased to 1762 for mix 13-6 as opposed to mix 13-1 absolute viscosity at 1179 Poise.

From the forgoing it is now understood and expected that all liquid or all powder or combinations thereof cross linking agents and optionally all liquid or all powder polymers may be pre-blended or added in any combination deemed useful in modifying asphalt or cross linking rubber whether in the absence or presence of asphalt or bitumen.

Carbonates in Universal Cross Linking Compounds

In the materials used to create the data in Table 14 below, a new asphalt source was used. This asphalt had a penetration range of 120 $\frac{1}{10}$ mm to 150 $\frac{1}{10}$ mm and is commonly used in the industry. The SBS polymer used is generally available in the market and is a linear triblock with no diblock present. The composition of the SBS is 29% styrene and 71% butadiene by weight. The melt flow rate is 12 grams/10 minutes under 200° C., 5kg. conditions. This polymer would be generally classified as a low molecular weight linear triblock SBS block copolymer. The hydrated Sodium Carbonate, Aluminum Sulfate, Magnesium Sulfate, 32° Be (about 22% by weight) Aluminum Chloride, Calcium Chloride, Group VIA Element—Sulfur and the Resol Phenolic Resin are all commercially available materials.

The mixing procedures included turbine propeller mixing as previously described. The test procedures used to analyze the data are as previously described except as noted. The only exception noted is the elastic recovery at 25° C. as opposed to 10° C. in previous data.

Carbonates may also be used as a cross linking agent in the redox reactions. The table below illustrates the utility of using hydrated Sodium Carbonate as a cross linking agent. Improvements to the elastic recovery can be made to a polymer-modified asphalt by using hydrated Sodium Carbonate with the redox chemicals Aluminum sulfate and Aluminum Chloride. This is illustrated in comparing the Absolute Viscosity of mix no.'s 9886, 9887 and 9888 of Table 14, below, at 8131, 2581 and 3468 Poise, respectively. The higher Absolute Viscosity of mix no. 9886 at 8131 Poise is unexpected. Further utility of carbonates in a universal cross linking system is shown Table 14 mix no. 9889 by comparing its 4° C. Penetration at 51 units and 25° C. Elastic Recovery at 22.50 percent with that of mix no. 9886 at 38

TABLE 13

| Formula %/Test/Mix No. | 13-1 | 13-2 | Starch 13-3 | 13-4 | 13-5 | 13-6 |
|---|---|---|---|---|---|---|
| Asphalt - AC-5 | 100.00 | | 98.087 | 95.80 | 97.02 | 98.10 |
| Corn Starch | | | 1.00 | 1.50 | 1.50 | [4]0.50 |
| 250 Bloom Gelatin | | 3.00 | | | | |
| Ammonium Nitrate | | | | | [3]0.30 | |
| Glycerin | | | | | | [4]0.10 |
| Ferrous Sulfate | | 0.10 | 0.20 | 0.20 | 0.20 | 0.20 |
| Calcium Chloride | | | | | 0.40 | 0.40 |
| Ferric Chloride | | 0.20 | 0.40 | 0.40 | | |
| Group VIA Element - Sulfur | | | 0.10 | 0.10 | | 0.10 |
| Resol Phenolic Resin | | 0.20 | 0.20 | 0.20 | 0.20 | 0.20 |
| Phenolic Resin - Quebracho | | | | 1.50 | | |
| Phenolic Resin - Tannic Acid | | | | | 0.10 | 0.10 |
| Phosphate | | | | [2]0.30 | | 0.30 |
| E-4819 Soap, pH= 2.0–2.5 | | | [1]0.013 | | | |
| 4° C. Penetration, 1/10 mm | | 22 | | 27 | 40 | |
| 25° C. Penetration, 1/10 mm | | 55 | | 59 | 100 | |
| Ring & Ball Soft Pt., ° F. | | 128 | | 132 | 117 | |
| Absolute Viscosity @ 60° C., P | 1179 | 6247 | 2721 | 8295 | 2088 | 1762 |

[2] & [3] Added as 24.0 grams of 5.0 wt. % solution in water
[4] Added as 25.0 grams of 8.0 wt. % starch and 1.60 wt. % glycerin solution in water units and 72.50 percent respectively. This comparison illustrates the possible effects on the final product by changing the material being cross linked from a SBS to a SBX rubber functionalized by the presence of Carboxylic Acid in the polymer chain in the formulary for mix no.'s 9886 and 9889, respectively.

Carbonates used in combination with other known redox components as a universal cross linking compound, such as but not limited to, Magnesium Sulfate and Calcium Chloride components and Group VIA metals of the Periodic Table and cross linking Phenolic Resins, respectively, are illustrated in mix no.'s 9890 through 9894 in Table 14 below. By comparison of the Ring and Ball Softening Points of mix no.'s 9890 and 9891 at 125° F. and 134° F., respectively, one may observe the increased softening point by the presence of hydrated Sodium Carbonate in the formulary. The lowering of the Elastic Recovery percentage from mix no. 9890 to that of mix no. 9891 at 70.00% to 51.25% is unexpected. The lower Elastic Recovery is confirmed by changing the Sulfate portion of the formulary from Aluminum Sulfate in mix no. 9891 to Magnesium Sulfate in mix no. 9892 with the value of 51.25% the same in both mixes. The high value for Ring and Ball Softening point is confirmed by the presence of hydrated Sodium Carbonate at values of 135° F. and 134° F. as compared to 125° F. in mix no.'s 9892, 9891 and 9890, respectively.

By examining the data of mix no. 9893 with the addition of a Resol Phenolic resin to the Universal Cross Linking Agent formulary over mix no. 9891, one may observe that the Elastic Recovery at 25° C. is increased to 60.00% from 51.25%, respectively.

The properties of the product resulting by changing the universal cross linking agent components, but not limiting such changes, from that of mix no. 9891 to mix no. 9894, Aluminum Sulfate and Aluminum Chloride to Magnesium Sulfate and Calcium Chloride, respectively, are illustrated by the increased Elastic Recovery at 25° C. and Penetration at 4° C. and 25° C. The Elastic Recovery at 25° C. of 51.25% for nix no. 9891 has been increased to a value of 66.25% in mix no. 9894. The Penetration's at 4° C. and 25° C. for mix no. 9891 are 45 and 92 units, respectively. Penetrations's at 4° C. and 25° C. for mix no. 9894 are 49 and 102 units, respectively.

These changes in values for the various physical properties of individual formulary teach the art of combining various non limiting redox chemicals with known, but not limited to, cross linking materials and other agents to create a universal cross linking agent heretofore unknown in the art.

TABLE 14

Usage of Carbonates in Universal Cross Linking Compound

| Formula %/Test/Mix No. | 9886 | 9887 | 9888 | 9889 | 9890 | 9891 | 9892 | 9893 | 9894 |
|---|---|---|---|---|---|---|---|---|---|
| Asphalt (120/150 Pen) | 96.50 | 97.00 | 96.70 | 96.50 | 96.60 | 96.40 | 96.40 | 96.30 | 96.40 |
| Low MW Triblock SBS Rubber | 3.00 | 3.00 | 3.00 |  | 3.00 | 3.00 | 3.00 | 3.00 | 3.00 |
| Carboxylated SBX Rubber |  |  |  | 3.00 |  |  |  |  |  |
| Hyd. Sodium Carbonate | 0.20 |  |  |  | 0.20 |  | 0.20 | 0.20 | 0.20 |
| Aluminum Sulfate | 0.20 |  | 0.20 | 0.20 | 0.20 | 0.20 |  | 0.20 |  |
| Magnesium Sulfate |  |  |  |  |  |  | 0.20 |  | 0.20 |
| 32° Be Aluminum Chloride, Dry | 0.10 |  | 0.10 | 0.10 | 0.10 | 0.10 | 0.10 | 0.10 |  |
| Calcium Chloride |  |  |  |  |  |  |  |  | 0.10 |
| Group VIA Element - Sulfur |  |  |  |  | 0.10 | 0.10 | 0.10 | 0.10 | 0.10 |
| Resol Phenolic Resin |  |  |  |  |  |  |  | 0.10 |  |
| 4° C. Penetration, 1/10 mm | 38 | 45 | 45 | 51 | 48 | 45 | 43 | 45 | 49 |
| 25° C. Penetration, 1/10 mm | 88 | 99 | 93 | 94 | 93 | 92 | 92 | 95 | 102 |
| Ring & Ball Softening Pt., ° F. | 125 | 120 | 122 | 125 | 125 | 134 | 135 | 126 | 125 |
| Absolute Viscosity @ 60° C., P | 8131 | 2581 | 3468 | 3882 | 4070 | 4131 | 4115 | 4140 | 3256 |
| Elastic Recovery @ 25° C., % | 22.50 | 17.50 | 42.50 | 72.50 | 70.00 | 51.25 | 51.25 | 60.00 | 66.25 |

A New Segmented Rubbery Copolymer

Prior art has taught that segmented or block copolymers can be created with a number of components and by a number of means or techniques. Examples of processes for creating blockpolymers are found in U.S. Pat. No. 2,666,042 and U.S. Pat. No. 3,030,346 which are included herein by reference. Prior art also teaches that homopolymers of butadiene may be structured such that predominately blocks of cis 1,4; trans 1,4 and vinyl 1,2 poly butadiene contents in block fashion may be formed. The art of such polymerization techniques are disclosed in U.S. Pat. Nos. 3,140,278 and 3,159,691 and included here in by reference. It is also taught and included herein by reference in U.S. Pat. No. 4,226,952 that the quantity of vinyl 1,2 butadiene may be controlled by the reaction temperature and that such materials find utility in hydrogenation for blending with alpha-olefin polymers and copolymers. Examples of hydrogenation of block copolymers of butadiene and a monovinyl aryl hydrocarbon such as styrene are taught in Re. 27,145 and included here in by reference. Included herein by reference U.S. Pat. No. 3,182,052 teaches the utility of high cis 1,4 polybutadiene with minimal vinyl 1,2 butadiene being advantageous. It is also taught in the art that high vinyl 1,2 butadiene content polymers may be hydrogenated and "functionilized" by grafting. Three examples of such art are included here in by reference in U.S. Pat. No. 4,292,414 the so called "ENE" process; U.S. Pat. No. 4,578,429 commonly known to be reduced to practice by Shell Oil Company, Houston, Tex. and U.S. Pat. No. 4,994,508 issued to Asahi Kasei Kogyo Kabushiki Kaisha of Osaka, Japan. Long known and understood in the art is the importance in differences by which a polymer is prepared. The influence of a method of preparation of a polymer is disclosed here in by reference in U.S. Pat. No. 3,251,905 wherein it is taught that random copolymers, graft copolymers and block copolymers may differ in their properties even though the weight percent of each of the monomeric materials in the polymer are relatively the same. Included herein U.S. Pat. No. 3,135,716 teaches that terminally reactive polymers may be made by proper selection of components to react onto the polymer chain and at the same time terminate the polymerization reaction.

None of the foregoing art teaches that a block copolymer consisting of the segments A-B-C-D-E has been created or found utility in industry. Therefore, it is the object of the art disclosed here in to teach that such a polymer is not only practical to produce but is also useful in at least one industry.

What has been found is that a block copolymer consisting of the segments A-B-C-D-E may be synthesized by known art in a unique fashion to create surprisingly useful products for industrial applications. This multi segmented polymer may be made in a single reactor there by reducing process time. It is also envisioned that multiple reactors and sequencing steps with coupling agents and or grafted components will be within the scope of the art disclosed here in.

It is understood there exists many deviations or variations from the examples of previously disclosed art which will be well with in the scope and understanding of the new art disclosed here in. Further such nonlimiting examples and included here in by reference would be U.S. Pat. No. 3,598,887 and U.S. Pat. No. 3,639,521 which teach coupling of block polymers by various means and methods.

Based on the forgoing known art, non limiting examples of suitable hydrocarbylithium initiators are: n-butyllithium; n-dodecylithium; n-octylithium; (cyclohexyl)methylithium; (cyclodecyl)methylighium; (2-cycloheptyl)ethylithium; (3-ethylcyclopentyl)methylithium; isobutylithium; 2,6-dimethyl-4ehtylheptylithium; n-pentylithium; n-hexylithium; n-heptylithium; 2-(4-ethylcyclohexyl) ethylighium; and like or similar moieties.

It is also envisioned that polyfinctional treating agents can be employed. Such non limiting examples would be: benzene-1,4-diisocyanate; di(2-phenyl-1-aziridinyl)propyl phosphine oxide; 1,4-mapthalene dicarboxyaldehyde; dichlorodiethylsilane; diethyldiallyltin; carbon dioxide; 1,2-divinylbenzene; 1,6-divinylmapthalene; 4-4"-divinylbiphenyl; and other like or similar compounds.

Nonlimiting examples of polar compounds are: dimethyl ether; diethyl ether; ethyl methyl ether; ethyl propyl ether; di-n-propyl ether; di-n-octyl ether; di-n-dodecyl ether; dibenzyl ether; diphenyl ether; dicyclohexyl ether; decyl cyclohexyl ether; cyclopentyl phenyl ether; anisole; tetrahydrofuran; 1,2-dimethoxyethane; 1,3-dioxane, 1,4-sulfide; diethyl sulfide; di-n-dodecyl sulfide; dimethylethylamine; N,N-dimethylamiline; pyridine; quinoline; N-ethylpiperidine, N-methyl-N-ethylaniline; N-methylmorpholine, and the like.

As is disclosed and known by prior art and in this invention, non limiting examples of conjugated dienes containing from about 4 to 12 carbon atoms per molecule and 8 to 12 carbon atoms per molecule monovil-substituted aromatic hydrocarbon are: 1,3-butadiene, isoprene; 1,3-pentadiene, 2,3-dimethyl-1,3-butadiene, 2-ethyl-1,3-pentadiene, 1,3-hexadiene; 2-methyl-1,3-hexadiene, 1,3-octadiene, 2-methyl-1,3-undecadiene, 2-methyl-3-isopropyl-1,3-butadiene; and the like.

Also known and disclosed by prior art and disclosed in this invention is the use of monovinyl substituted aromatic hydrocarbons. Nonlimiting examples of monovinyl substituted aromatic hydrocarbons are: styrene; 3,5-diethylstyrene; 4-n-propylstyrene; 4-cyclohexylstyrene; 4-phenylstyrene; 4-methoxystyrene; 3-pentoxystyrene; 2,4, 6-trimethylstyrene; 4-decylstyrene; 1-vinylnapthalene; 8-phenyl-1-vinylnapthalene; 3-benzylstyrene; epsilon-caprolactone; epsilo-thiocaprolactone; propylene sulfide; acrylonitrile; methacrylonitrile; butyl acrylate; methyl methacrylate; acetaldehyde; and the like.

Known to the art is that polyermization can be conducted in the presence or absence of diluent. Such inert hydrocarbon diluents are typically selected from aromatics, paraffins or cycloparaffins and mixtures thereof and in general contain from about 4 to 10 carbon atoms. Nonlimiting examples of such hydrocarbon diluents are: isobutane; n-pentane; isooctane; n-dodecane; cyclopentane; cyclohexane; methylcyclopentane; ethylcyclopentane; dimethylcyclopentane; ethylcyclohexan; benzene; toluene; xylene; ethylbenzene; napthalene; and the like.

Understood in the industry is that polymerization conditions typically range from about −80° C. to about 150° C. under autogenous pressure. It is further understood that temperatures and pressures sufficient to maintain the monomeric materials substantially in the liquid phase are typical but not limiting.

As is taught in the known art polymerization catalysts, difunctional or polyfunctional treating agents, polar compounds vinyl aromatic hydrocarbons, conjugated dienes, hydrogenation catalysts, degree of hydrogenation and other related components of the particular polymerization technique being employed will vary in concentration and method of entering the reaction sequence depending upon the desired final polymer properties such as but not limited to degree of hydrogenation, endcaping with functional end group, branching or like or similar features of a particular polymer segment.

As is now disclosed, understood and taught here in are surprisingly good and useful polymeric compositions of new matter that may contain or having the following sequence of segmented or block structures in a single molecule of A-B-C-D-E where in:

A=a segment of at least 5 wt. % of a vinyl aromatic hydrocarbon;

B=a segment of at least 1 wt. % of a mixture of varying proportions (commonly known in the industry as unbound or tapered) of the vinyl aromatic hydrocarbon and the conjugated diene;

C=a segment of at least 10 wt. % of a conjugated diene;

D=a segment of at least 3 wt. % a pendent vinyl structure of the conjugated diene of segment C;

E=a optional segment of at least one molecule of a functional end group per polymer molecule.

A styrene butadiene block polymer as synthesized by the present invention is made by adding the desired amount of styrene to a reactor vessel containing a solvent. The amounts of styrene and, for example, the solvent n-cyclohexane will vary depending upon the desired level of each reactant in the final product, product architecture or structure and the final product molecular weight. This is in accordance with the teachings of known art, an example of which is taught in, but not limited to, U.S. Pat. No. 3,281,383 (now included herein by reference). To this mixture of styrene and n-cyclohexane solvent is added to an organo-metal polymerization catalyst; an example of, but not limited to, such catalysts would be n-butyl lithium. The amount of the organo-metal polymerization catalyst in the reaction is determined by the desired final product molecular weight. The addition of the n-butyl lithium polymerization catalyst starts the polymerization of the styrene block described as segment A herein.

The reaction would begin at a temperature of about 30° C. or lower and may be allowed to rise to about 55–70° C. The reaction proceeds until substantially all the styrene is consumed. At a predetermined point, before all the styrene is reacted into a block of polystyrene, the 1,3-butadiene is introduced to the reaction mixture. By introduction of the 1,3-butadiene before all the styrene monomer is reacted, the "tapered" or "random" section of the final product of the process (the polymer) is formed. The "tapered" or "random"

section described as segment B is characterized by the presence of alternating sequences of butadiene and styrene. This "tapered" section is complete when all the styrene is reacted into the polymer chain.

As the reaction continues, 1,4-polybutadiene is formed in the polymer chain described as segment C. This process continues until the desired molecular weight is achieved. Once the desired molecular weight is achieved in the reaction sequence, the temperature may be lowered to about 40° C. in order to maximize the formation of 1,2-vinyl groups in the butadiene block to complete the butadiene section of the block polymer described in segment D. Alternately amine or ether compounds may be added to the reactants to form 1,2-vinyl groups. The reaction will, according to this invention, now form a polymer with a block of styrene, an optional tapered section, a block of 1,4-butadiene and a block of 1,2-vinyl butadiene.

An optional functional end group may be added to the terminal end of the polybutadiene section by stopping the reaction with, but not limited to, carbon dioxide ($CO_2$) and hydrochloric acid (HCl) to form a carboxylic (R—COOH) end group. Optionally, the reaction may be terminated by phosphoric acid ($H_3PO_4$) or phosphorous pentoxide ($P_2O_5$) to form a phosphate (R—$H_2PO_4$) end group, where R is the polymer disclosed herein described as segment E. Other functional end groups may be incorporated into the terminal end of a polymer produced by the art disclosed herein by, but not limited to, termination steps as disclosed in U.S. Pat. No. 3,135,716 and included herein by reference.

Optionally, the polymer synthesis process may be reversed in sequence. In this sequence, the 1,2-vinyl butadiene block portion may be synthesized after first charging the reactor vessel with cyclohexane and 1,3-butadiene followed by initiation of the reaction with n-butyl lithium and a ether or amine described as segment B. Once the desired amount of 1,2-vinyl butadiene is formed, the ether or amine may be stripped out by vacuum or other means as disclosed in U.S. Pat. Nos. 3,140,278 or by 4,226,952 and previously included here by reference. The polymerization sequence would then continue with the formation of the 1,4-butadiene block (C), the optional "tapered" block (B), the styrene block (A) and the optional functional group (E) in this order. This reversed synthesis now disclosed herein places the optional functional group on the terminal end of the styrene block.

By the foregoing, another option is creation of branched polymers having terminal block 1,2-vinyl configurations. Branching is taught in, but not limited to, U.S. Pat. Nos. 3,639,517 and 3,639,521 and 3,280,084 now included herein by reference. In these patents and others, are many examples that teach the art of branching a segmented polymer. One exemplary, but non-limiting chemical used is divinylbenzene. Further non-limiting options to polymer branching are taught in U.S. Pat. Nos.3,281,383 and 3,598,887 and 4219, 627 (now included herein by reference) wherein further definitions of suitable coupling agents and techniques are given. It is now possible to create "living" polymer segments in one reaction sequence and couple them to another "living" polymer segment in order to form the final polymer product. Also taught from prior art in the above referenced patents is the non-limiting technique of branching and continuing the reaction without making two separate "living" polymer segments and coupling them to complete the final polymer product.

A more specific non-limiting example of polymer branching follows. One can form segment "A" and the optional "tapered" segment "B" as previously disclosed. Segment "C" would then be formed by one of two techniques. The first technique would be to branch the polymer as taught in but not limited to U.S. Pat. No. 3,078,254, and now disclosed herein by reference, wherein chain lengthening or a "Y" branch or "Star" branch polymers may be created by selection of the appropriate coupling agent. Within the previously disclosed U.S. Pat. is taught the concept of the "living" polymer having two Lithium active end groups during the polymerization process. Therefore, it is anticipated that a polymer segment "C" made in this manner would react with section "B" and continue to react forming segment "D" and optional segment "E" as previously disclosed.

An alternate non-limiting technique to the above disclosed first technique is as follows. Segment "A," optional "tapered" segment "B," and a portion of segment "C" may now form the intermediary segment "A+B+C-" as previously disclosed. A portion of segment "C" would be formed in a separate reaction sequence along with segment "D" forming the intermediary segment "-C+D-" as previously disclosed. The intermediary segment "A+B+C-" would be introduced to the previously formed intermediary segment "-C+D-" as is taught in but not limited to U.S. Pat. Nos. 3,078,254 and 3,639,517 and 3,639521 and 3,280,084 and 3,281,383 and 3,598,887 and 4219,627 as previously disclosed. Optional segment "E" may be reacted onto the polymer chain as previously disclosed.

By the invention herein, a new composition of matter of surprising utility is taught. This composition of matter is a block polymer of at least three (3) and typically four (4) or five (5) blocks or segments of distinct and separate character; one of which is an optional functional group on either terminal end of the segmented or block polymer. Further, the new composition of matter may be synthesized in one reactor vessel.

Preferred Embodiment Examples of New Polymer of Form A-B-C-D-E

The following two polymers were made by processes known in the art but were of the new composition of matter in that:

A=poly styrene;
B=tapered section of butadiene and styrene;
C=poly 1,4-Butadiene;
D=poly 1,2-Butadiene;
E=end group of carboxylic acid (COOH) of one per polymer molecule.

A typical industrial application for which the above generally described polymer would find utility and surprising good properties would be in asphalt modification. More specifically, two polymers were produced for asphalt modification and compared to generally similar commercial polymers of the general form A-B-C (lacking segments D and E) as described above. The results of these comparisons are given in Table 15 and Table 16 below.

In Table 15 below the HM Carboxylated SBX Rubber of about 230,000 molecular weight units has the following composition according to the new form of:

A=block styrene segment of 18.0 wt. %;
B=tapered butadiene and styrene segment of 2.4 wt. %;
C=block 1,4-butadiene segment of at least 50/50 ratio or greater cis/trans configuration of 70.8 wt.
D=block 1,2-butadiene segment of 8.8 wt. %;
E end cap of one molecule carboxylic acid (COOH) per molecule polymer.

The HM Non Carboxylated SB Rubber had about 220,000 molecular weight units, is a commercially available product and the following composition:

A=block styrene segment of 10.0 wt. %;
B=tapered butadiene and styrene segment of 5.0 wt. %;

C=block styrene segment of about 50/50 ratio cis/trans configuration of 85.0 wt. %.

The AC-5 asphalt was from commercial sources and comprised mostly of local gulf coast and Venezuela crude oil sources. Both polymers were ground to about a 1 to 2 millimeter size before addition to the asphalt at the concentrations given in the table.

From the data of Table 15 it is surprising and unexpected that the time it took for mix 15-1, the HM Carboxylated SBX Rubber, to go into solution or dissolve or be digested by the asphalt as defined in Table 15 as the Rubber Solution Time in minutes was about one half the time for mix 15-2, the commercial HM Non Carboxylated SB Rubber, at 120 minutes and 240 minutes respectfully.

Another unexpected result is that the ductility is longer and elastic recovery greater for mix 15-1 at 84.75 cm and 87.50% than for mix 15-2 at 76.75 cm and 70.00% respectively.

Figure 7:
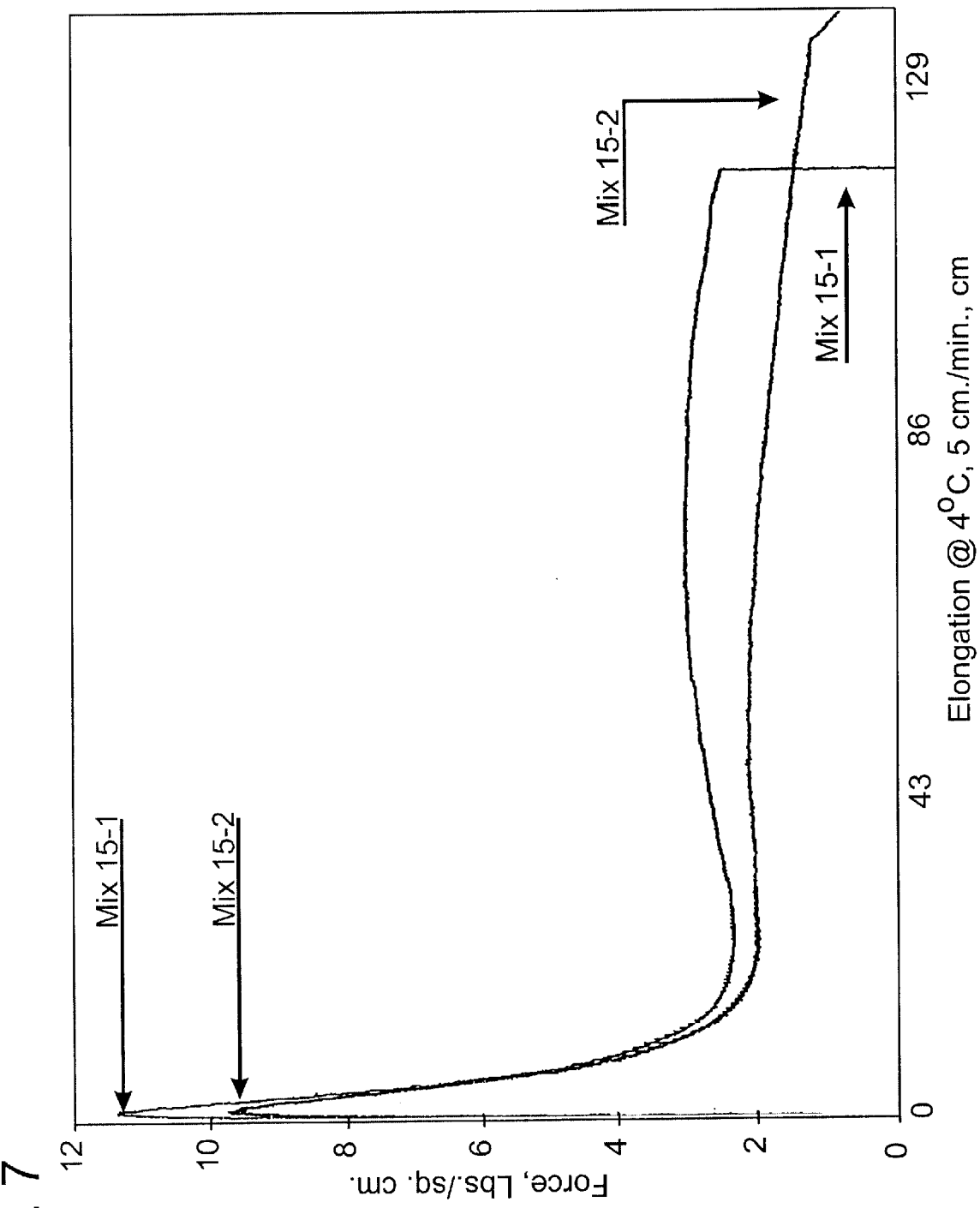

Also of interest is FIG. 7—Force Ductility of mix 15-1 and mix 15-2 respectfully. In FIG. 7, one may observe that mix 15-1 has a higher initial peak, higher force values upon elongation and lower elongation than mix 15-2 which is lower in initial peak, lower in force values upon elongation and longer elongation respectfully. These results would not be expected in light of mix 15-1 having higher 25° C. penetration and lower absolute viscosity at 127 units and 2807 P. than mix 15-2 at 113 units and 3765 P. respectively.

Figure 8:
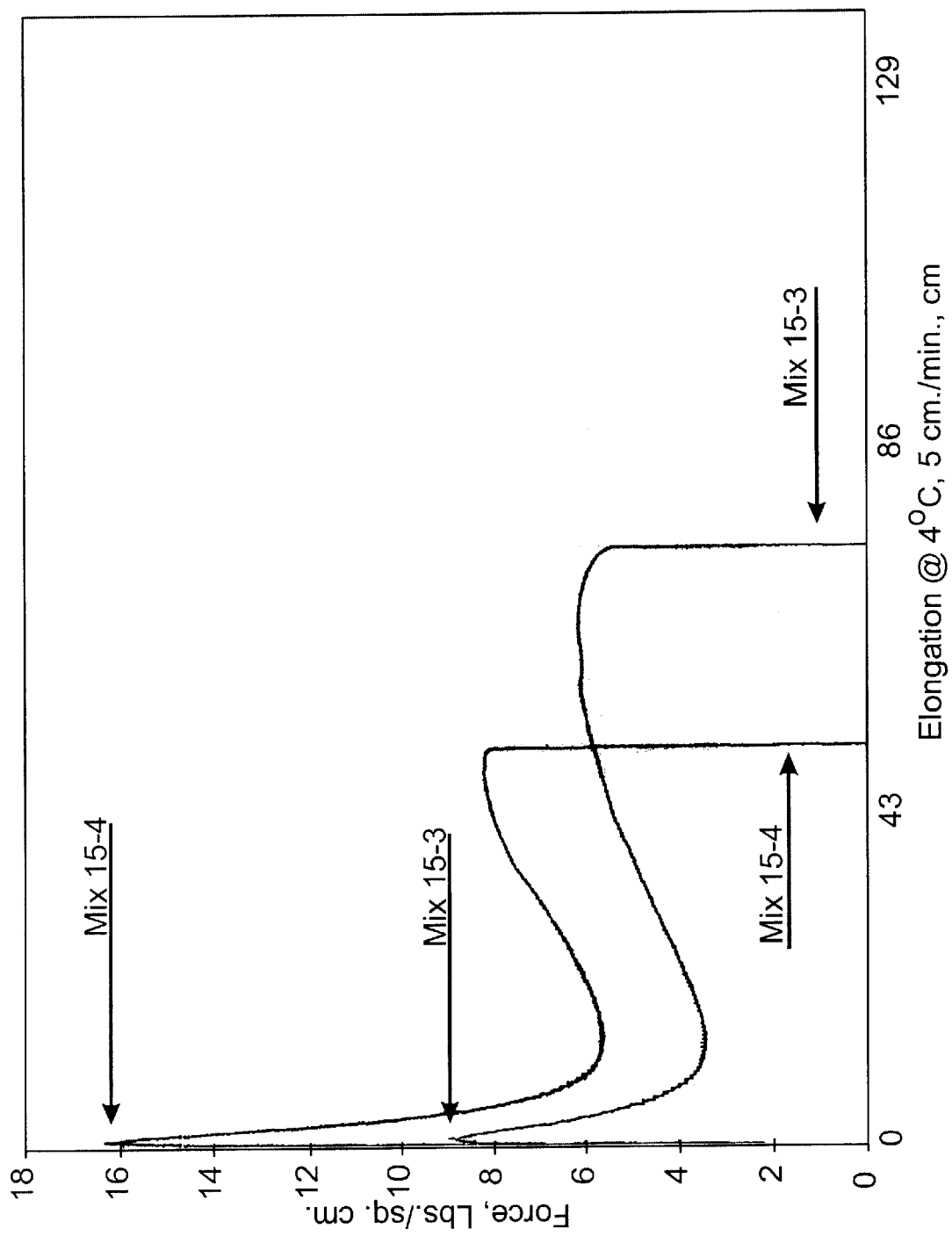

Mix 15-3 indicated the potential for the new HM Carboxylated SBX Rubber to react with known cross linking agents in comparison to mix 15-4 the HM Non Carboxylated SB Rubber. Again surprising results are that the ductility and elastic recovery for mix 15-3 is greater at 48.25 cm and 81.25% compared to mix 15-4 at 28.00 cm and 76.25% respectively. As before, these results would not be expected in light of mix 15-3 having higher 25° C. penetration and lower absolute viscosity at 114 units and 7367 P. than mix 15-4 at 97 units and 7894 P. respectively Completely unexpected was mix 15-3 and mix 15-4 force ductility results. FIG. 8 shows that the initial peak of mix 15-3 is lower, lower force values upon elongation and greater elongation than mix 15-4 which is higher in initial peak, higher in force values upon elongation and shorter in elongation respectfully. This is a reversal from Table 7-Force Ductility of the trend established between mix 15-1 and 15-2 as previously noted.

Completing the data of Table 15 is the utility of the new composition HM Carboxylated SBX Rubber with the previously disclosed here in universal cross linking agent as mix 15-5 indicates. As before, the commercially available HM Non Carboxylated SB Rubber is shown for comparison as mix 15-6 indicates.

In keeping with the previous two series of comparisons, mix 15-5 has the lower 25° C. penetration, lower ductility and higher (very surprising value) absolute viscosity at 97 units, 38.50 cm. and 81.25% respectively than mix 15-6 at higher 25° C. penetration, higher ductility and lower absolute viscosity at 116 units, 43.50 cm. and 77.50% respectively.

Figure 9:
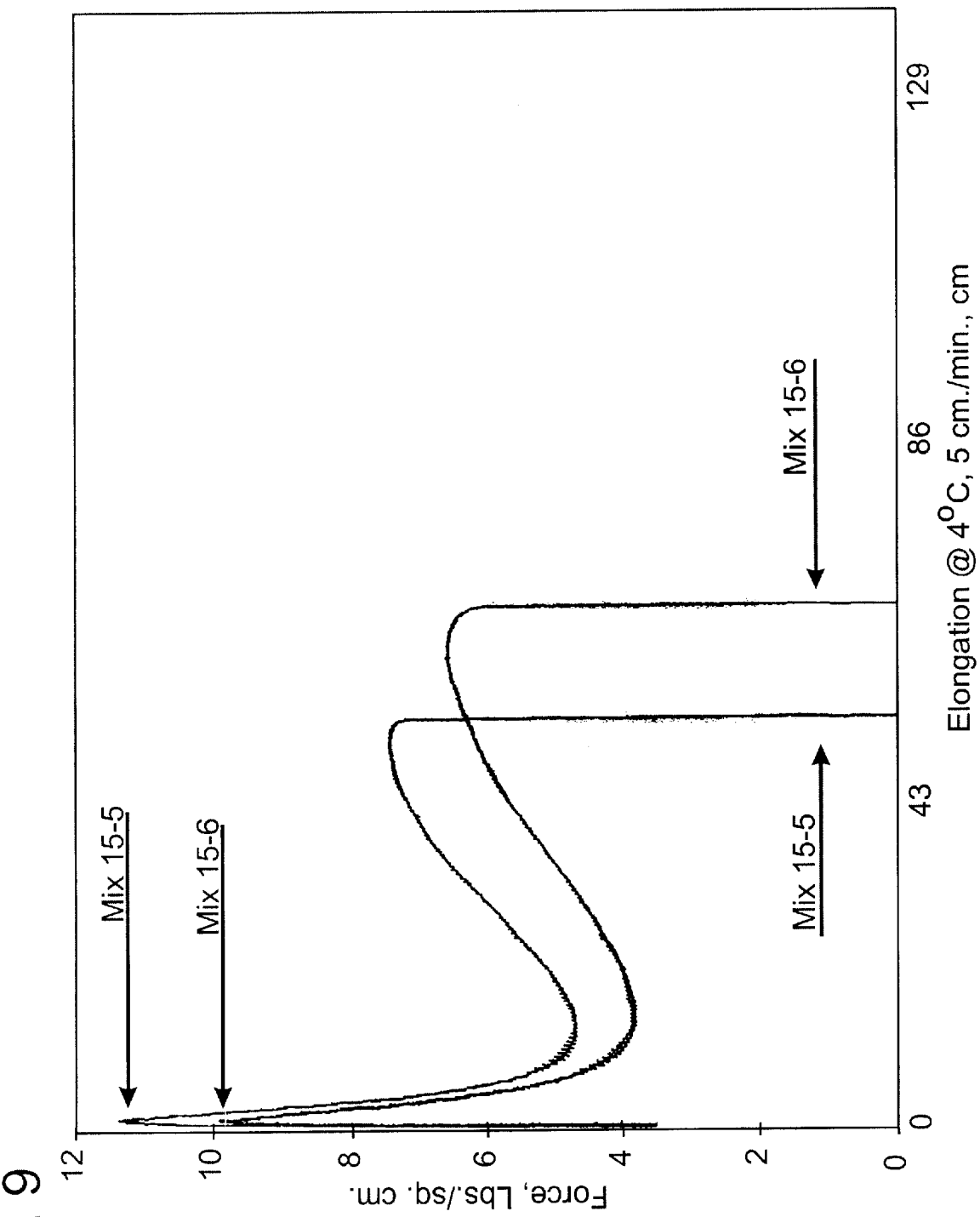

FIG. 9 shows force ductility results of mix 15-5 and mix 15-6 respectfully with the previously disclosed here in universal cross linking agent. By observation, mix 15-5 (the HM Carboxylated SBX Rubber) has the higher initial peak, higher force values upon extension and shorter extension than mix 15-6 (commercial HM Non Carboxylated SB Rubber) with lower initial peak, lower force values upon extension and longer extension respectively.

TABLE 15

The New SBX - Fisher & rubber technology

| Formula %/Test/Mix No. | 15-1 | 15-2 | 15-3 | 15-4 | 15-5 | 15-6 |
|---|---|---|---|---|---|---|
| Asphalt - AC-5 | 97.00 | 97.00 | 96.90 | 96.90 | 96.10 | 96.10 |
| HM Non Carboxylated SB Rubber |  | 3.00 |  | 3.00 |  | 3.00 |
| HM Carboxylated SBX Rubber | 3.00 |  | 3.00 |  | 3.00 |  |
| Butaphalt ® B-720 |  |  | 0.10 | 0.10 |  |  |
| Magnesium Sulfate |  |  |  |  | 0.20 | 0.20 |
| Calcium Chloride |  |  |  |  | 0.40 | 0.40 |
| Resol Phenolic Resin |  |  |  |  | 0.20 | 0.20 |
| Group VIA Element - Sulfur |  |  |  |  | 0.10 | 0.10 |
| Rubber Solution Time, min. | 120 | 240 |  |  |  |  |
| 4° C. Penetration, 1/10 mm | 47 | 49 | 43 | 36 | 47 | 48 |
| 25° C. Penetration, 1/10 mm | 127 | 113 | 114 | 79 | 97 | 116 |
| Ring & Ball Soft Pt., ° F. | 123 | 123 | 131 | 134 | 134 | 129 |
| Ductility @ 4° C., 5 cm/min, cm | 84.75 | 76.75 | 48.25 | 28.00 | 38.50 | 43.50 |
| Elastic Recovery @ 10° C., % | 87.50 | 70.00 | 81.25 | 76.25 | 81.25 | 77.50 |
| Absolute Viscosity @ 60° C., P | 2807 | 3765 | 7367 | 7894 | 9913 | 5669 |
| Separation, ΔT-B Soft. Pt., ° F. | −0.25 | +0.25 | −0.50 | −0.25 | 0 | +0.50 |

In Table 16 the term HMS is defined as High Molecular weight and high Styrene for both the HMS Carboxylated SBX Rubber and the HMS Non Carboxylated SB Rubber.

In Table 16 below the HMS Carboxylated SBX Rubber of about 207,000 molecular weight units has the following composition according to the new form of:

A=block styrene segment of 25.0 wt. %;
B=tapered butadiene and styrene segment of 14.1 wt. %;
C=block 1,4-butadiene segment of about 50/50 ratio cis/trans configuration of 51.4 wt. %;
D=block 1,2-butadiene segment of 8.7 wt. %;
E=end cap of one molecule carboxylic acid (COOH) per molecule polymer.

The HMs Non Carboxylated SB Rubber had about 220,000 molecular weight units, is a commercially available product and the following composition:

A=block styrene segment of 30.0 wt. %;
B=tapered butadiene and styrene segment of 10.0 wt. %;
C=block styrene segment of about 50/50 ratio cis/trans configuration of 60.0 wt. %.

Results of mix 16-1 indicate lower 25° C. penetration, lower ductility, higher elastic recovery and higher absolute viscosity at 86 units, 9.50 cm., 73,75% and 5793 P. respectively than mix 16-2 with higher 25° C. penetration, higher ductility, lower elastic recovery and lower absolute viscosity at 124 units, 16.75 cm., 68.75% and 2601 P. respectively.

Figure 10:
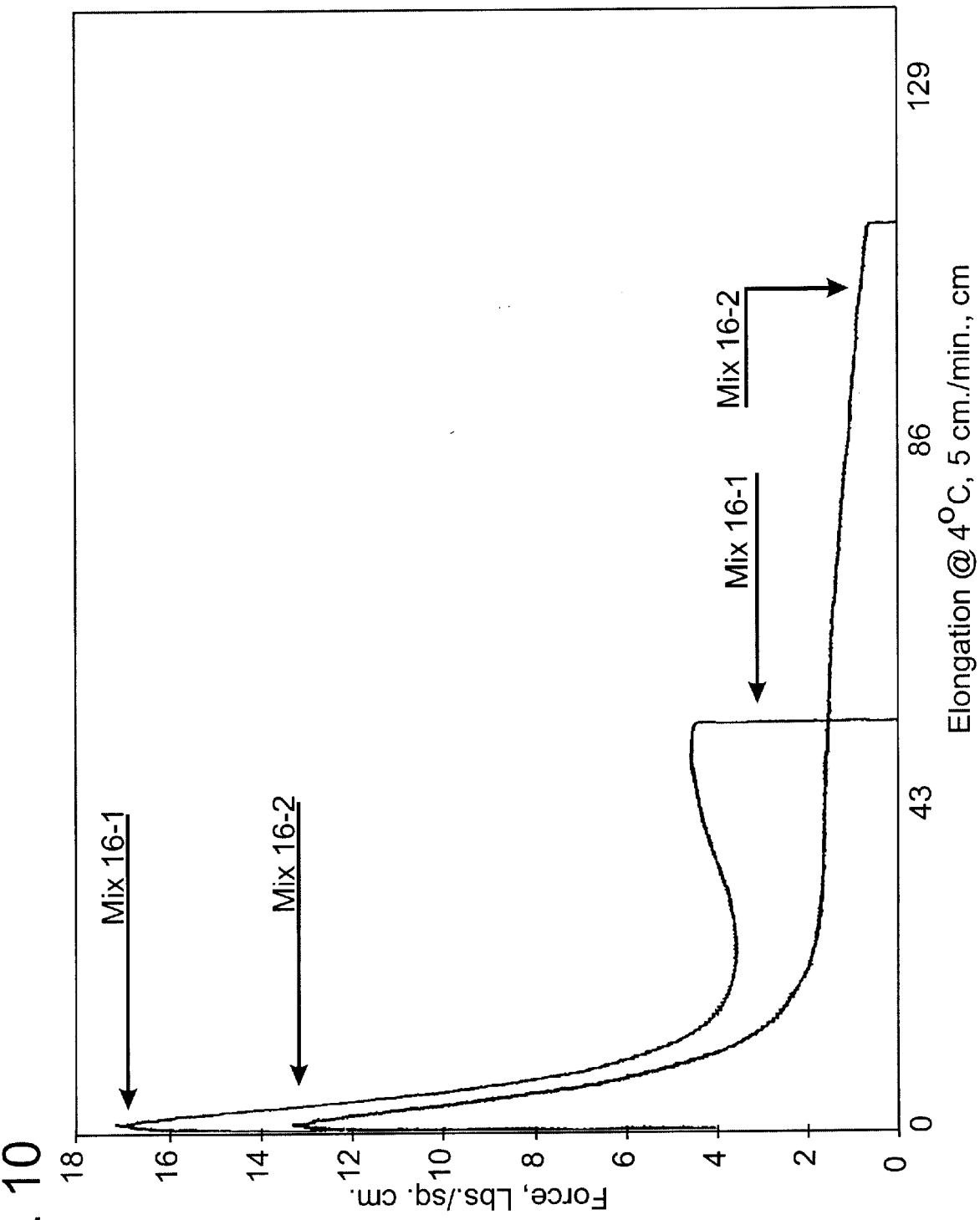

FIG. 10 indicates that mix 16-1 has higher initial peak, higher force values upon elongation and shorter elongation than mix 16-2 with lower initial peak, lower force values upon elongation and longer elongation respectively.

Mix 16-3 and mix 16-4 of Table 16 indicate the results of adding cross linking agents of the known art, Butaphalt® B-720 to HMS Carboxylated SBX Rubber (the new matter disclosed here in) and HMS Non Carboxylated SB Rubber (commercial product) respectfully.

Results found in Table 16 indicate mix 16-3 has lower 25° C. penetration, lower ductility, higher elastic recovery and higher (very surprising value) absolute viscosity at 87 units, 20.50 cm. 83.75% and 18568 P. respectively than mix 16-4 at higher 25° C. penetration, higher ductility, lower elastic recovery and lower absolute viscosity at 121 units, 50.25 cm., 80.00% and 4471 P. respectively.

Figure 11:
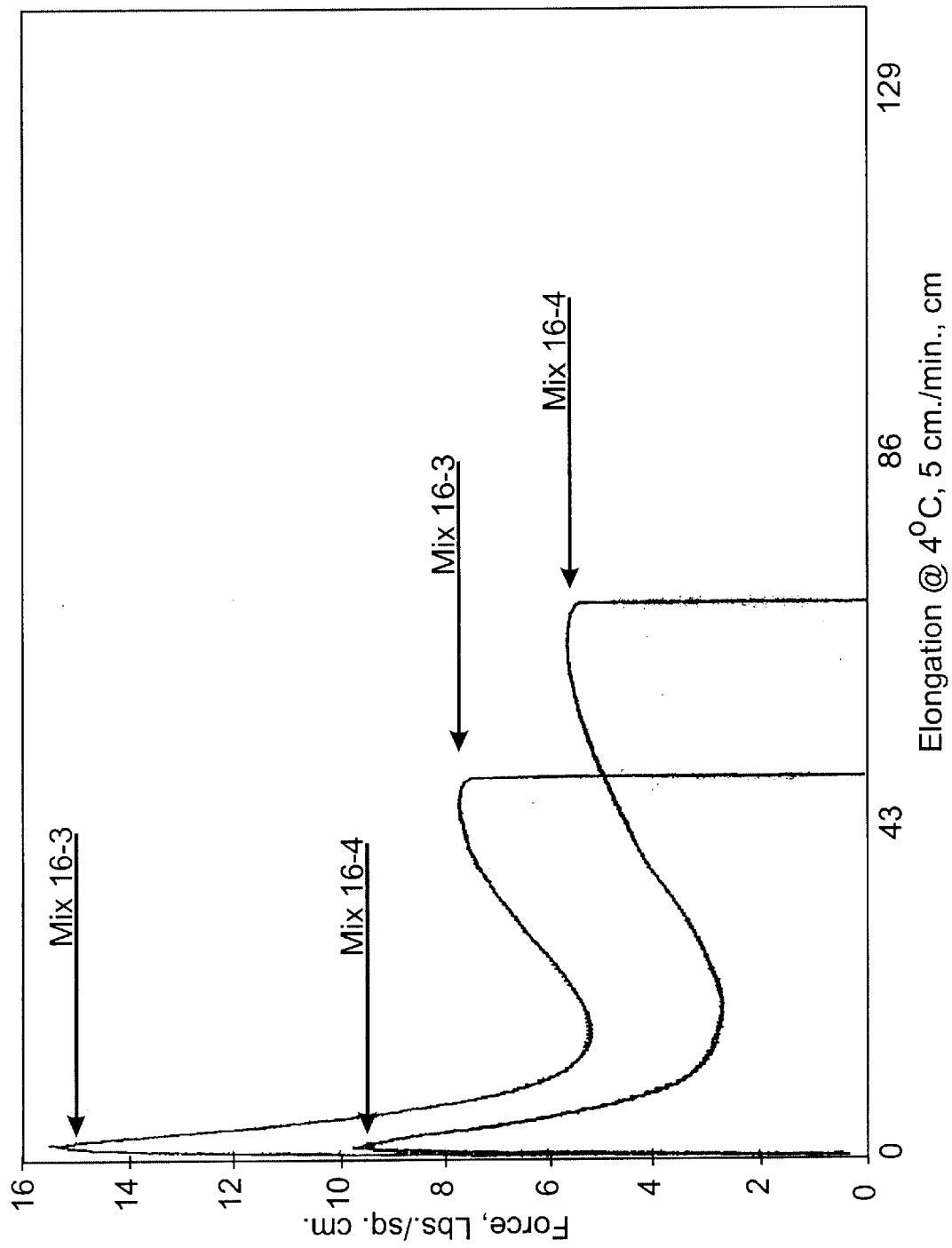

FIG. 11 reflects force ductility as similar to previously noted. Mix 16-3 has higher initial peak, higher force values upon elongation and shorter elongation than mix 16-4 with lower initial peak, lower force values upon elongation and longer elongation respectively.

TABLE 16

New Polymer at high Styrene

| Formula %/Test/Mix No. | 16-1 | 16-2 | 16-3 | 16-4 |
|---|---|---|---|---|
| Asphalt - 120/150 pen | 97.00 | 97.00 | 96.90 | 96.90 |
| HMS Non Carboxylated SB Rubber | | 3.00 | | 3.00 |
| HMS Carboxylated SBX Rubber | 3.00 | | 3.00 | |
| Butaphalt ® B-720 | | | 0.10 | 0.10 |
| 4° C. Penetration, 1/10 mm | 38 | 47 | 35 | 52 |
| 25° C. Penetration, 1/10 mm | 86 | 124 | 87 | 121 |
| Ring & Ball Soft Pt., ° F. | 126 | 119 | 131 | 123 |
| Ductility @ 4° C., 5 cm/min, cm | 9.50 | 16.75 | 20.50 | 50.25 |
| Elastic Recovery @ 10° C., % | 73.75 | 68.75 | 83.75 | 80.00 |
| Absolute Viscosity @ 60° C., P | 5793 | 2601 | 18568 | 4471 |

Non limiting examples of other industrial applications of block copolymers having the form A-B-C-D-E would be: Adhesives in general; hot melt adhesives; asphalt emulsions; asphalt roofing; asphalt speciality; glues in general; foot ware in general; high impact plastics modification in general; general rubber applications to numerous to list; and other like or similar industrial applications.

It in now apparent to those skilled in the art that previously unknown block copolymers having the form A-B-C-D-E may be produced by techniques known in the art that will find advantage and utility in industrial applications.

It is now possible for one of average skill in the art to modify asphalt by techniques previously unknown. The art disclosed here in allows for greater range in product formulation and processing. The examples disclosed here in are not limiting in scope but are designed to illustrate the practical application of previously unknown art.

What is claimed is:

1. A polymer modified asphalt or bitumen which comprises:
    asphalt or bitumen;
    a natural or synthetic polymer;
    a universal cross linking agent consisting of:
        a) aldehyde, phenol aldehyde or melamine resins;
        b) Group VI-A elements or donors thereof; and
        c) carbonates; and
    a redox product produced by a reaction consisting of a compound of the form $M(A)_x$ where M is a metal and A is an anion, and a compound of the form $MH_x$ where M is a metal and H is another metal and X is an integer equal to or greater than 1.

2. A polymer modified asphalt or bitumen as set forth in claim 1 wherein said synthetic polymer is either block or random and is solid or latex vinyl aromatic hydrocarbon and conjugated diene.

3. A polymer modified asphalt or bitumen as set forth in claim 2 wherein said vinyl aromatic hydrocarbon is styrene and said conjugated diene is butadiene.

4. A polymer modified asphalt or bitumen as set forth in claim 1 wherein said aldehyde is furfural at levels greater than about 0.05 wt. % of the total polymer modified asphalt.

5. A polymer modified asphalt or bitumen as set forth in claim 1 wherein said Group VI-A element is sulfur.

6. A polymer modified asphalt or bitumen as set forth in claim 1 wherein said Group VI-A element is dissolved in a hydroxide solution of a Group I-A element.

7. A polymer modified asphalt or bitumen as set forth in claim 6 wherein said Group I-A element hydroxide is sodium hydroxide at levels greater than about 0.05 wt. % of the polymer modified asphalt.

8. A polymer modified asphalt or bitumen as set forth in claim 1 wherein said cross linking agent is catalysed by mineral or organic acid or base.

9. A polymer modified asphalt or bitumen as set forth in claim 8 wherein said mineral acid is hydrochloric acid.

10. A polymer modified asphalt or bitumen as set forth in claim 8 wherein said organic acid is toluene sulfonic acid.

11. A polymer modified asphalt or bitumen as set forth in claim 1 including both said phenol aldehyde and aldehyde and wherein said phenol aldehyde is a resin dissolved in aldehyde.

12. A method of producing a polymer modified asphalt or bitumen compound which comprises the steps of:
    modifying asphalt or bitumen with a natural or synthetic polymer additive;
    adding a universal cross linking agent consisting of aldehyde alone or in combination with phenol aldehyde or melamine resins to said polymer modified asphalt and thereafter mixing;
    adding an element chosen from the group consisting of Group VI-A of the Periodic Table of Elements as an additive to the polymer modified asphalt and said agent and thereafter mixing.

13. A method of producing a polymer modified asphalt or bitumen compound which comprises the steps of:
    dissolving an element chosen from the group consisting of Group VI-A of the Periodic Table of Elements in an alkali metal hydroxide solution; and
    mixing the resulting solution in a mixture of asphalt or bitumen and a polymer additive.

14. A polymer modified asphalt or bitumen as set forth in claim 1 wherein:
    said Group VIA element is dispersed or dissolved in water; and
    said salt is dispersed or dissolved in water.

15. A polymer modified asphalt or bitumen as set forth in claim 1 including at least one functional end group on each said polymer.

16. A polymer modified asphalt or bitumen as set forth in claim 15 wherein said functional end group is a carboxylic acid end group or a hydroxyl group.

17. A polymer modified asphalt or bitumen as set forth in claim 16 wherein said polymer is of natural origin selected from a group consisting of cellulose, starch, glycogen, mono- or di- saccharide, and natural rubber.

18. A polymer modified asphalt or bitumen as set forth in claim 1 wherein said polymer is either starch or gelatin or both.

19. A polymer modified asphalt as set forth in claim 2 wherein said vinyl aromatic hydrocarbon is styrene and the conjugated diene is butadiene.

20. A polymer modified asphalt or bitumen as set forth in claim 1 wherein said polymer is alpha olefin of ethylenic unsaturation chosen from the group consisting of ethylene vinyl acetate, methyl acrylate and acrylic acid copolymers thereof.

21. A polymer modified asphalt or bitumen as set forth in claim 14 wherein said metal M is selected from Groups I-A, II-A, III-A, I-B, II-B, VIII-B of the Periodic Table of Elements or the Alkali Metal Group or complexes thereof.

22. A polymer modified asphalt or bitumen as set forth in claim 14 wherein said metal M is selected from the group iron, magnesium, sodium, potassium, calcium, tin, or combinations there of.

23. A polymer modified asphalt or bitumen as set forth in claim 14 wherein said anion A is selected from Groups VI-B, VII-B of the Periodic Table or a member of the Group of Negative Ions or a member of the Halide Group of Negative Ions or complexes thereof.

24. A polymer modified asphalt or bitumen as set forth in claim 23 wherein said anion A is selected from a group consisting of Group VII-A Elements of the Periodic Table.

25. A polymer modified asphalt or bitumen as set forth in claim 24 wherein said anion A is either chlorine, oxygen, sulfate, or phosphate.

26. A polymer modified asphalt as set forth in claim 1 wherein said aldehyde is furfural.

27. A polymer modified asphalt as set forth in claim 1 wherein said phenol aldehyde resin is either a novalac or resol resin.

28. A polymer modified asphalt as set forth in claim 27 wherein said novalac resin contains hexamethylenetetramine.

29. A polymer modified asphalt as set forth in claim 27 wherein said resol resin is natural or synthetic in origin.

30. A polymer modified asphalt as set forth in claim 29 wherein said resol resin is natural in origin and is tannic acid or quebracho.

31. A polymer modified asphalt as set forth in claim 29 wherein said resol resin is synthetic and contains methylol.

32. A polymer modified asphalt or bitumen as set forth in claim 14 wherein said hydroxide of Group I-A elements of the Periodic Table is sodium hydroxide.

33. A polymer modified asphalt or bitumen as set forth in claim 14 including an element selected from Group VI-A of the Periodic Table and a soap.

34. A polymer modified asphalt or bitumen as set forth in claim 33 wherein said soap is a cationic soap.

35. A polymer modified asphalt or bitumen as set forth in claim 34 wherein said cationic soap contains a saponified amine or amines and mineral acid.

36. A polymer modified asphalt or bitumen as set forth in claim 35 wherein the saponified amine or amines contains primary diamines.

37. A polymer modified asphalt or bitumen as set forth in claim 35 wherein the mineral acid is hydrochloric acid.

38. A polymer modified asphalt as set forth in claim 2 wherein said block copolymer has a plurality of segments including a segment A of at least five wt. % of said vinyl aromatic hydrocarbon; a segment B of 0 wt % or greater of a mixture of varying proportions of a vinyl aromatic hydrocarbon and a conjugated diene; and a segment C of at least 10 wt. % of a conjugated diene.

* * * * *